(12) United States Patent
Kwon et al.

(10) Patent No.: US 10,100,250 B2
(45) Date of Patent: Oct. 16, 2018

(54) LIQUID CRYSTAL DISPLAY

(71) Applicant: Samsung Display Co., Ltd., Yongin-si, Gyeonggi-do (KR)

(72) Inventors: Sun Young Kwon, Seoul (KR); Ji Hong Bae, Yongin-si (KR); Keun Chan Oh, Hwaseong-si (KR); Seul Gee Lee, Seoul (KR); Jin Hyeong Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/296,637

(22) Filed: Oct. 18, 2016

(65) Prior Publication Data

US 2017/0260452 A1   Sep. 14, 2017

(30) Foreign Application Priority Data

Mar. 9, 2016   (KR) .................. 10-2016-0028192

(51) Int. Cl.
| | |
|---|---|
| *G02F 1/1333* | (2006.01) |
| *C09K 19/30* | (2006.01) |
| *C09K 19/54* | (2006.01) |
| *G02F 1/1335* | (2006.01) |
| *G02F 1/1339* | (2006.01) |
| *G02F 1/1368* | (2006.01) |

(52) U.S. Cl.
CPC .......... *C09K 19/3003* (2013.01); *C09K 19/54* (2013.01); *G02F 1/1368* (2013.01); *G02F 1/13394* (2013.01); *G02F 1/133514* (2013.01); *C09K 2019/301* (2013.01); *C09K 2019/3004* (2013.01); *C09K 2019/3009* (2013.01); *C09K 2019/3016* (2013.01); *G02F 2001/13396* (2013.01); *G02F 2201/121* (2013.01); *G02F 2201/123* (2013.01)

(58) Field of Classification Search
CPC ............... C09K 19/3003; C09K 19/54; C09K 2019/3004; C09K 2019/3009; C09K 2019/301; C09K 2019/3016; G02F 1/133514; G02F 1/13394; G02F 1/1368; G02F 1/1333; G02F 2001/13396; G02F 2201/121; G02F 2201/123

USPC ....................... 428/1.1; 252/299.63
See application file for complete search history.

(56) References Cited

U.S. PATENT DOCUMENTS

| | | | |
|---|---|---|---|
| 6,475,595 B1 | 11/2002 | Bremer et al. | |
| 8,858,829 B2 | 10/2014 | Okamoto et al. | |
| 8,968,842 B2 | 3/2015 | Bae et al. | |
| 9,181,481 B2 | 11/2015 | Bae et al. | |
| 9,422,477 B2* | 8/2016 | Oh ..................... | G02F 1/134309 |
| 2013/0092875 A1 | 4/2013 | Okamoto et al. | |
| 2017/0031213 A1* | 2/2017 | Kwon ............... | G02F 1/133711 |
| 2017/0052412 A1* | 2/2017 | Bae ................... | G02F 1/133711 |

FOREIGN PATENT DOCUMENTS

| | | |
|---|---|---|
| JP | 05-320081 A | 12/1993 |
| KR | 10-2013-0121223 A | 11/2013 |
| KR | 10-2015-0028405 A | 3/2015 |

OTHER PUBLICATIONS

Detlef Pauluth et al. "Advanced liquid crystals for television", Journal of Materials Chemistry, 2004, 14, pp. 1219-1227.

* cited by examiner

*Primary Examiner* — Geraldina Visconti
(74) *Attorney, Agent, or Firm* — Cantor Colburn LLP

(57) ABSTRACT

A liquid crystal display including a first substrate, a second substrate overlapping with the first substrate, and a liquid crystal layer provided between the first substrate and the second substrate, wherein the liquid crystal layer includes a liquid crystal compound represented by Formula 1 and a liquid crystal stabilizing agent:

Formula 1

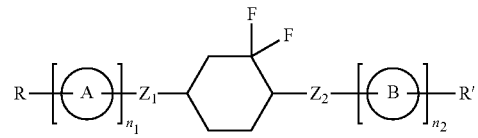

wherein A, B, n1, n2, R, R', $Z_1$, and $Z_2$ are the same as described in the specification.

12 Claims, 11 Drawing Sheets

LIQUID CRYSTAL DISPLAY

This application claims priority to and the benefit of Korean Patent Application No. 10-2016-0028192 filed in the Korean Intellectual Property Office on Mar. 9, 2016, the entire contents of which are incorporated herein by reference.

BACKGROUND (a) Technical Field

The present disclosure relates to a liquid crystal display.

(b) Description of the Related Art

A liquid crystal display is currently one of the most widely used display devices. The liquid crystal display generally includes two sheets of display panels on which field generating electrodes are formed, and a liquid crystal layer provided therebetween. The liquid crystal display applies a voltage to the field generating electrodes to generate an electric field on the liquid crystal layer, determines an alignment of liquid crystal molecules provided on the liquid crystal layer, and controls transmittance of light passing through the liquid crystal layer.

A liquid crystal composition is very important in the liquid crystal display to achieving a desired image by controlling the transmittance of light. In particular, with variation of use of liquid crystal displays, various characteristics such as low-voltage driving, a high voltage holding ratio (VHR), a wide viewing angle, a wide operation temperature range, and high-speed response are desired.

In order to secure high-speed response characteristics of the liquid crystal display, research efforts for improving physical properties such as rotational viscosity, a refractive index, and an elastic coefficient of the liquid crystal composition have been undertaken.

The above information disclosed in this Background section is only for enhancement of understanding of the background of the present disclosure, and therefore may contain information that does not comprehensively cover the prior art that is known in this country to a person of ordinary skill in the art.

SUMMARY

The present disclosure has been made in an effort to provide a liquid crystal display with low rotational viscosity and a stability-improved liquid crystal composition.

Further, the technical object to be achieved by the present disclosure is not limited to the aforementioned technical objects, and other unmentioned technical objects will be apparent to those skilled in the art from the description below.

An exemplary embodiment provides a liquid crystal display including:

a first substrate;

a second substrate overlapping with the first substrate; and a liquid crystal layer provided between the first substrate and the second substrate, wherein the liquid crystal layer includes:

a liquid crystal compound represented by Formula 1, and a liquid crystal stabilizing agent.

Formula 1

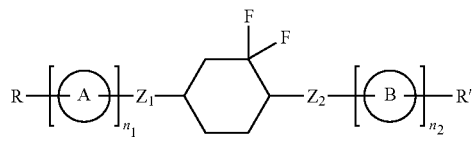

A is each independently one of formulae

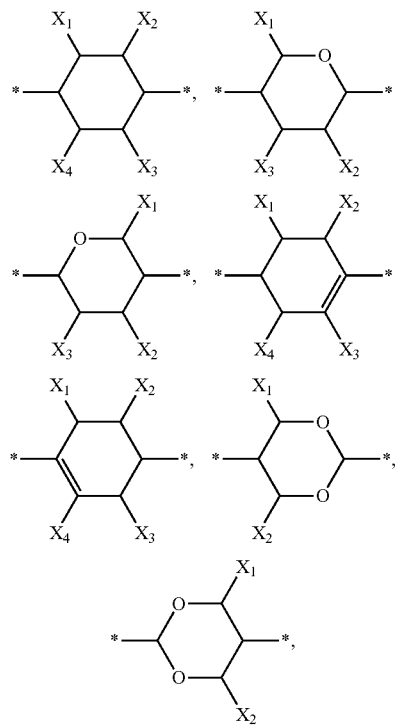

B is each independently one of formulae

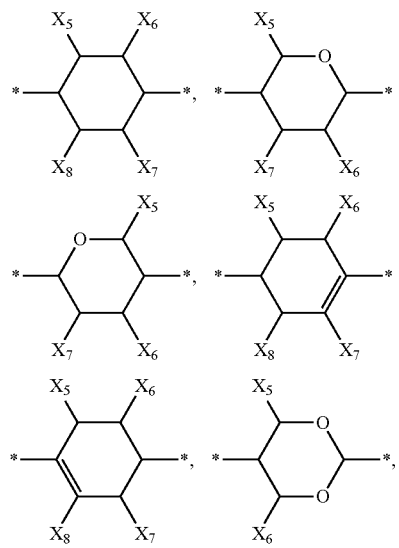

-continued

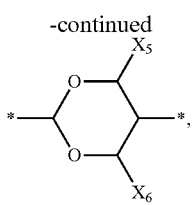

wherein,

* indicates a binding site to a neighboring atom, $X_1$ to $X_8$ are each independently one of hydrogen (H), fluorine (F), chlorine (Cl), —$OCF_3$, —$CF_3$, —$CH_2F$, or —$CHF_2$, $Z_1$ and $Z_2$ are each independently selected from —C(=O)O—, —OC(=O)—, —$CF_2$O—, —O$CF_2$—, —$CH_2$O—, —O$CH_2$—, —$SCH_2$—, —$CH_2$S—, —$C_2F_4$—, —$CH_2CF_2$—, —$CF_2CH_2$—, —$(CH_2)_z$— (wherein z is a natural number that is equal to or greater than 1 and equal to or less than 5), —CH=CH—, —CF=CF—, —CH=CF—, —CF=CH—, —CH=CH$CH_2$O—, and a single bond, R and R' are each independently one of a C1 to C12 alkyl group, hydrogen, a halogen, or a cyano group, and $n_1$ and $n_2$ are each independently an integer between 0 and 5.

The compound represented by Formula 1 may include a compound represented by Formula 1-1.

Formula 1-1

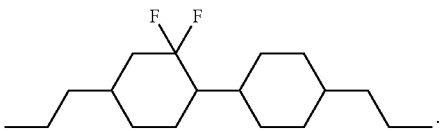

The liquid crystal stabilizing agent may include at least one of a compound represented by Formulae A-1 to A-28.

Formula A-1

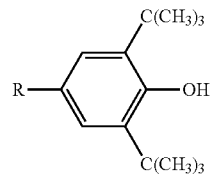

Formula A-2

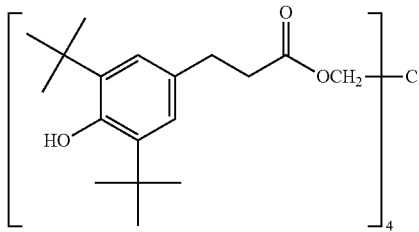

Formula A-3

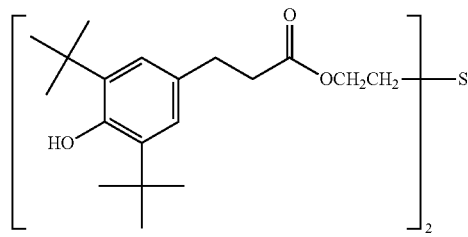

Formula A-4

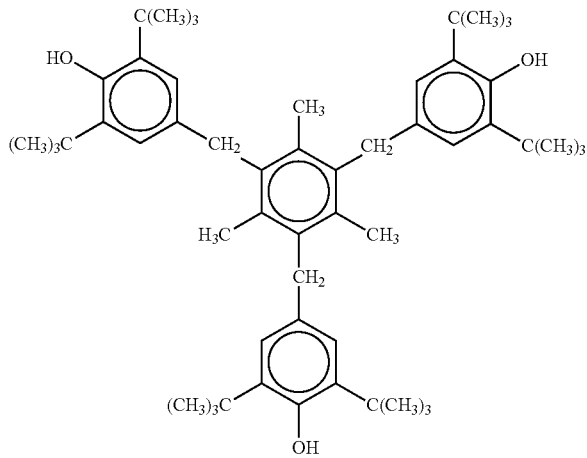

Formula A-5

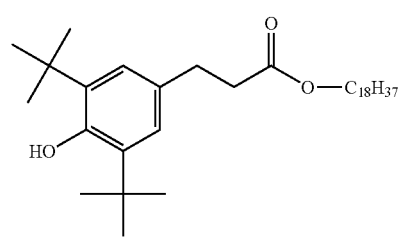

Formula A-6

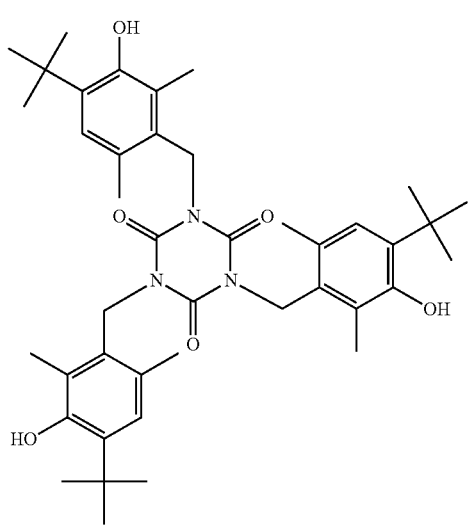

-continued
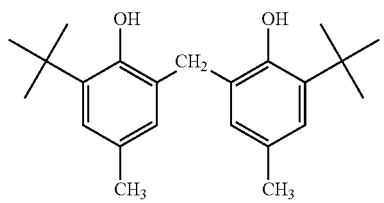
Formula A-7
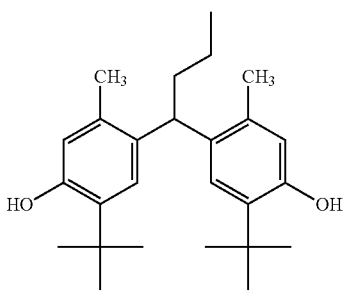
Formula A-8
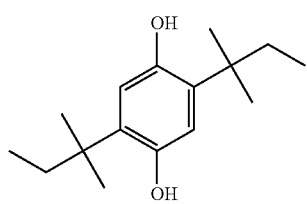
Formula A-9
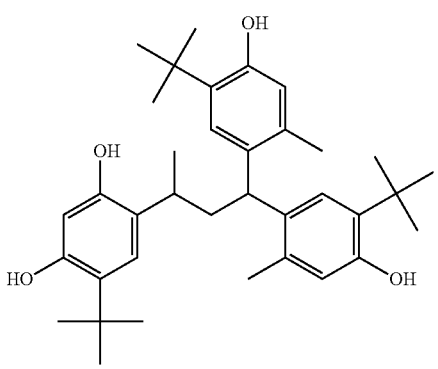
Formula A-10
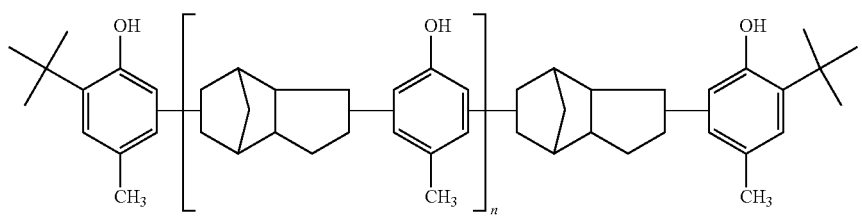
Formula A-11
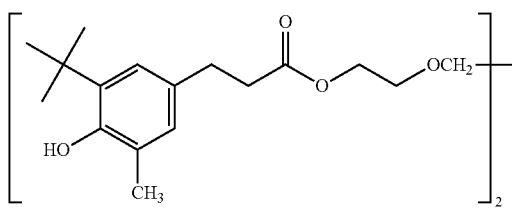
Formula A-12
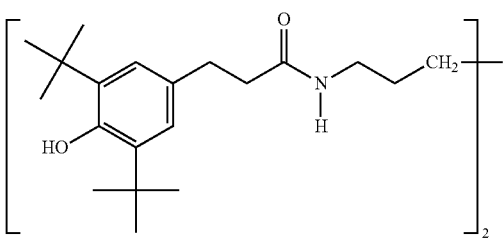
Formula A-13
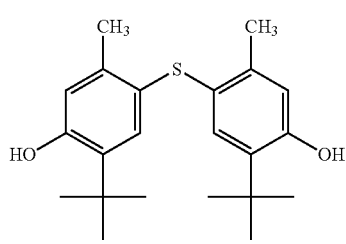
Formula A-14
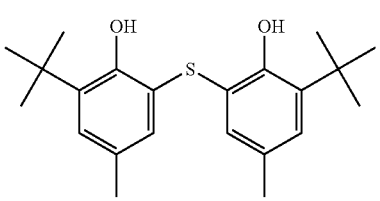
Formula A-15
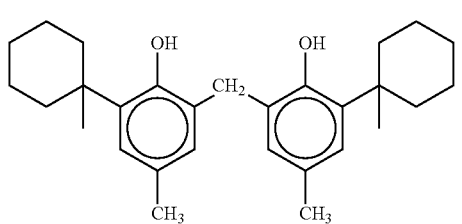
Formula A-16
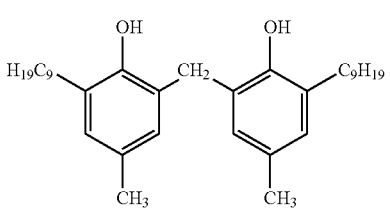
Formula A-17

Formula A-18
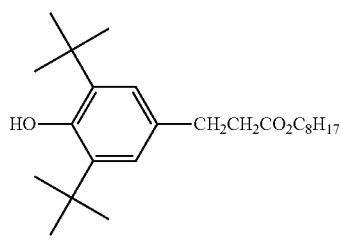
Formula A-19
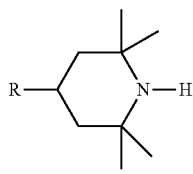
Formula A-20
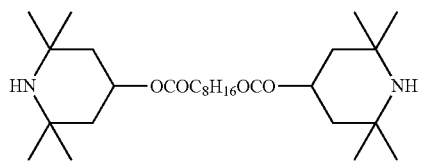
Formula A-21
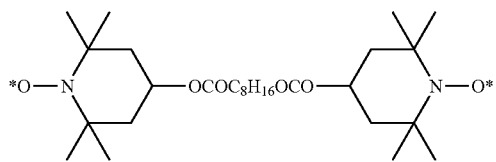
Formula A-22
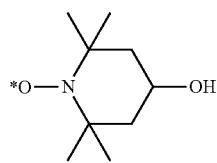
Formula A-23
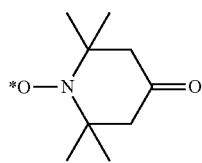
Formula A-24
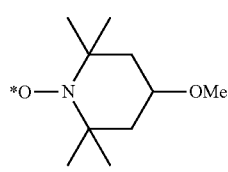
Formula A-25
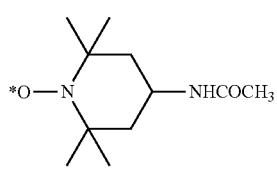
Formula A-26
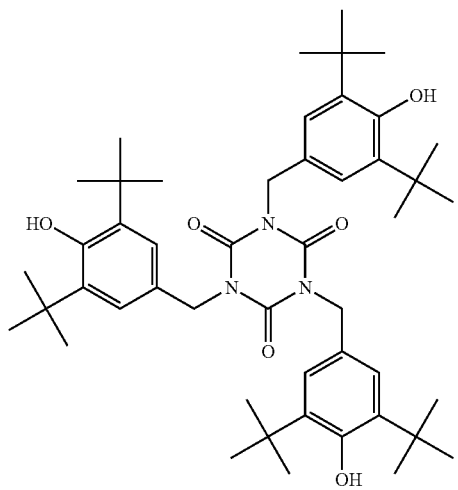
Formula A-27
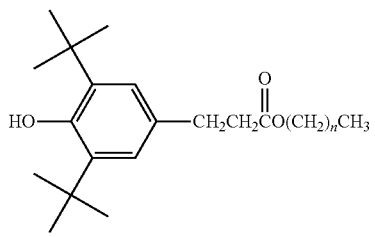
Formula A-27
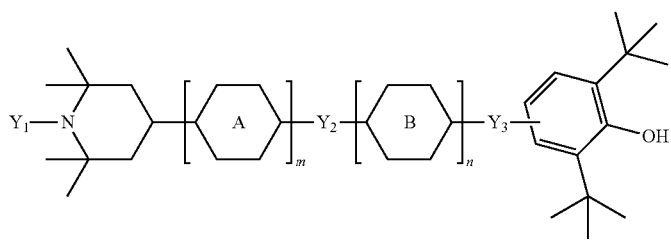
In the Formula A-28,
$Y_1$ is one of —H, —OR, or —R,
$Y_2$ is one of —O—, —OC(=O)—, —OR'—, —R'O—, or —R'—,
$Y_3$ is one of —O—, —OC(=O)—, —OR'—, —R'O—, or —R'—,
A and B each independently include one of a cyclohexylene group, a C3 to C7 cyclic ether group, or a phenylene group, R is a C1 to C5 alkyl group,
R' is a C1 to C5 alkylene group, and
m and n are each independently an integer of 0 to 5,
in the Formula A-1,
R is a C1 to C10 alkyl group or a C2 to C10 alkenyl group,
in the Formula A-11,
n is an integer that is equal to or greater than 0 and is equal to or less than 5,
in the Formula A-19,
R is a C1 to C10 alkyl group or a C2 to C10 alkenyl group,
in the Formula A-27, and
n is a natural number of 1 to 15.

The compound represented by Formula A-28 may include at least one of a compound represented by Formula A-28' and a compound represented by Formula A-28".

Formula A-28'

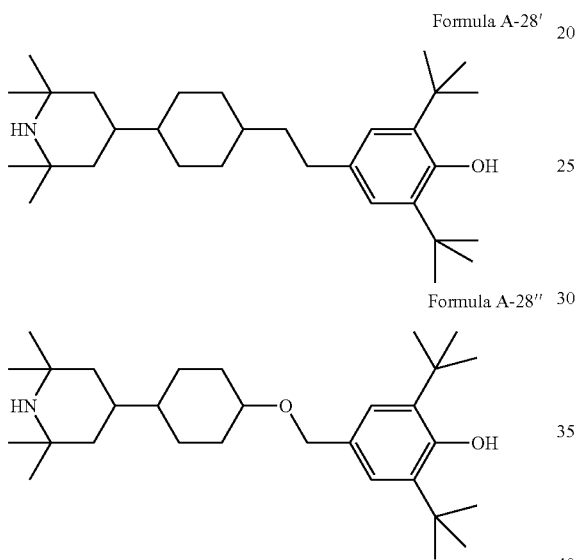

Formula A-28"

An amount of the compound represented by Formula 1 may be about 3 percent by weight to about 20 percent by weight based on the content of the entire content of a liquid crystal composition constituting the liquid crystal layer.

The liquid crystal composition may include about 100 parts per million to about 500 parts per million of the liquid crystal stabilizing agent.

The liquid crystal layer may further include at least one selected from compounds represented by Formula 2 to Formula 21.

Formula 2

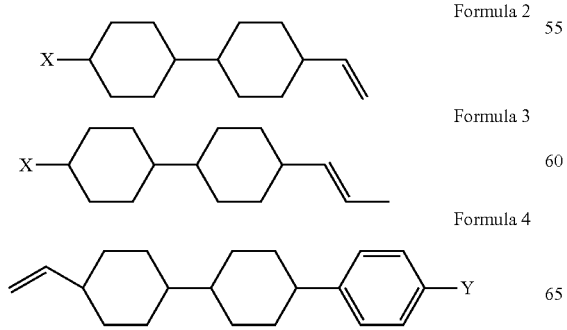

Formula 3

Formula 4

Formula 5

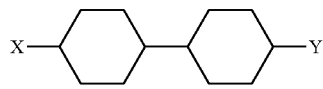

Formula 6

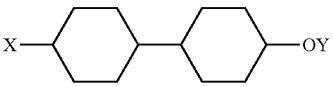

Formula 7

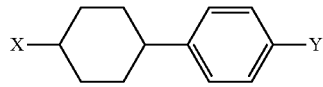

Formula 8

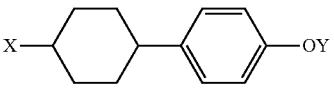

Formula 9

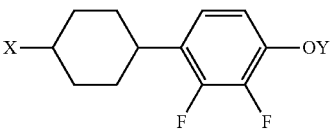

Formula 10

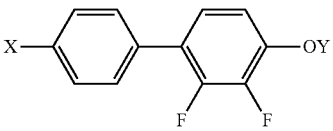

Formula 11

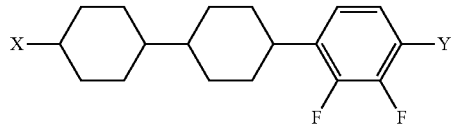

Formula 12

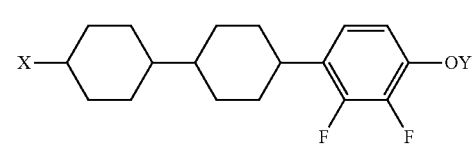

Formula 13

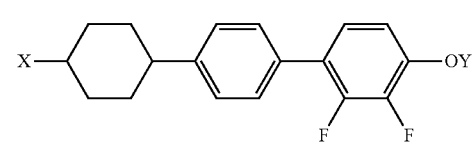

Formula 14

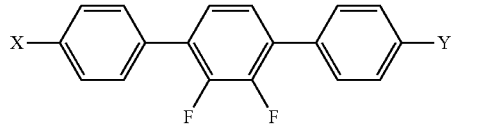

Formula 15

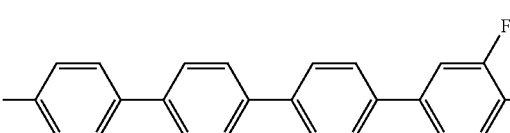

Formula 16

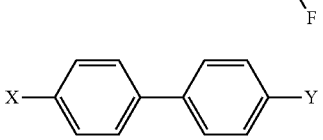

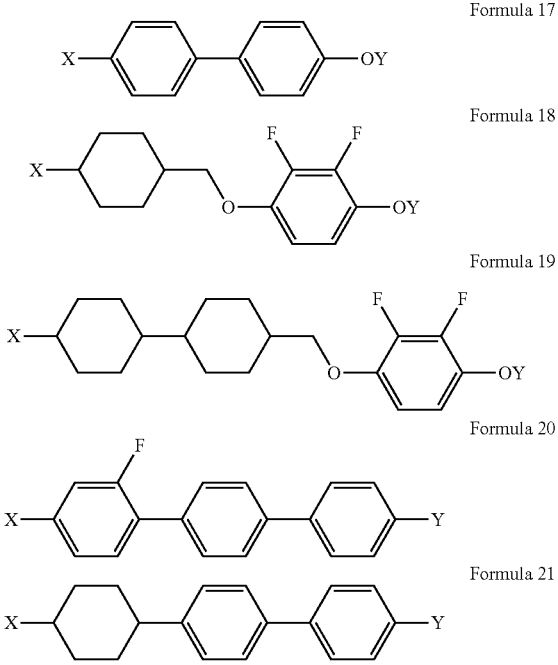

wherein X and Y are independently $C_nH_{2n+1}$, wherein n is independently a natural number of 1 to 5.

The liquid crystal display may further include:
a thin film transistor provided on the first substrate;
a pixel electrode connected to the thin film transistor; and
a common electrode provided between the second substrate and the liquid crystal layer.

The liquid crystal display may further include:
a light blocking member provided between the pixel electrode and the liquid crystal layer,
wherein the light blocking member may include:
a light blocker,
a first spacer, and
a second spacer,
wherein the first spacer and the second spacer are connected to the light blocker and protruded toward the second substrate.

At least one selected from the pixel electrode and the common electrode may include a cutout.

The liquid crystal display may be curved.

In the liquid crystal display,
liquid crystal molecules that are adjacent to the first substrate may have a pretilt, and
liquid crystal molecules that are adjacent to the second substrate may be perpendicular to the second substrate.

According to the exemplary embodiments, quality of the liquid crystal display may be improved by using a liquid crystal composition with low rotational viscosity and improved reliability.

BRIEF DESCRIPTION OF THE DRAWINGS

The above and other aspects, advantages, and features of this disclosure will become more apparent by describing in further detail exemplary embodiments thereof with reference to the accompanying drawings, in which.

DETAILED DESCRIPTION OF THE EMBODIMENTS

Figure 1:
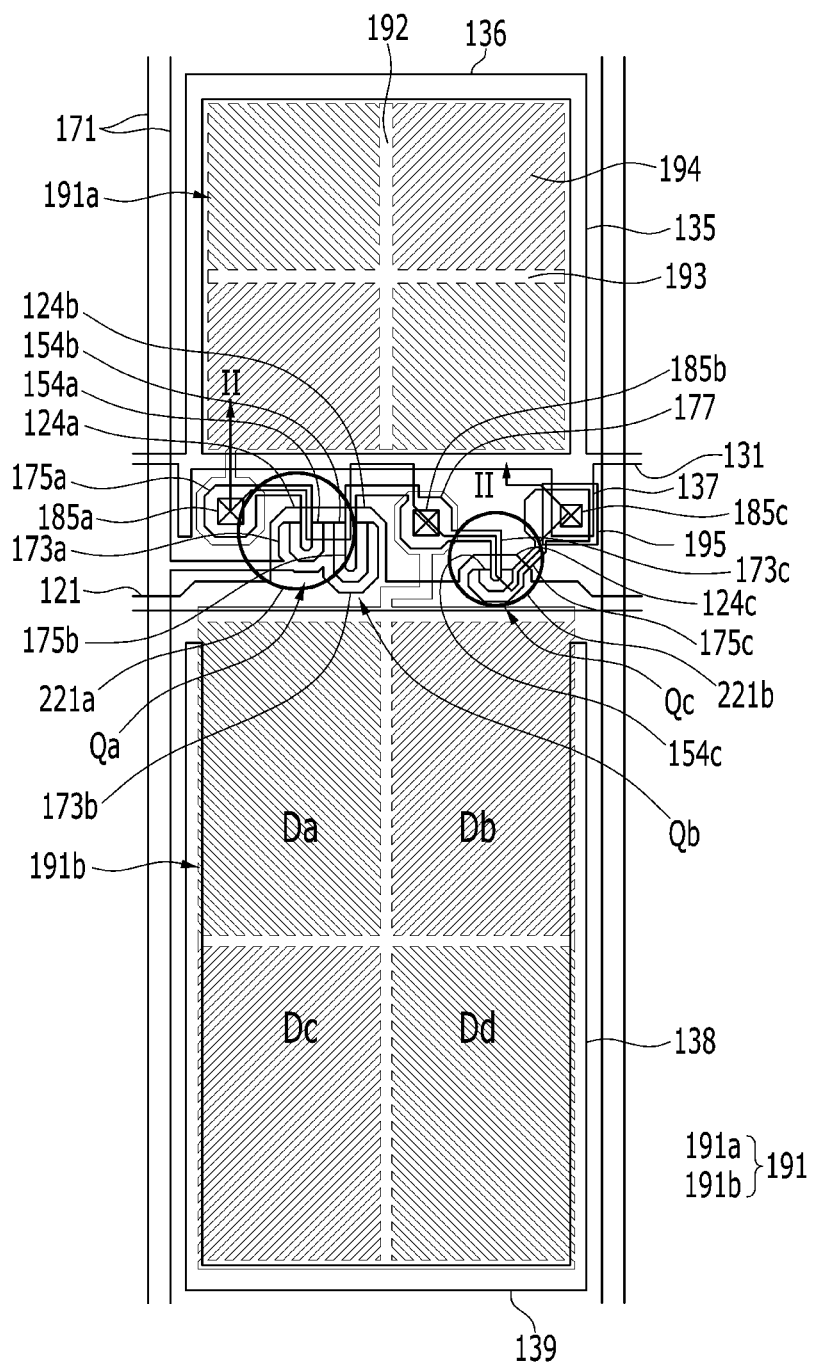
FIG. 1 shows a top plan view of a pixel of a liquid crystal display according to an exemplary embodiment.

In the following detailed description, only certain exemplary embodiments have been shown and described, simply by way of illustration. Reference will be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Rather, these embodiments are provided so that this disclosure will be thorough and complete, and will fully convey the effects and features of the present disclosure and ways to implement the present disclosure will fully convey the concept of the invention to those skilled in the art. Accordingly, the exemplary embodiments are merely described below, by referring to the figures, to explain aspects. As those skilled in the art would realize, the described embodiments may be modified in various different ways, all without departing from the spirit or scope of the present disclosure. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. In the drawings, like reference numerals denote like elements throughout, and thus redundant description thereof will be omitted.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

A part irrelevant to the description will be omitted to clearly describe the present inventive concept, and like elements will be designated by like reference numerals throughout the specification.

The size and thickness of each component illustrated in the drawings are arbitrarily illustrated in the drawings for better understanding and ease of description, but the present disclosure is not limited to these illustrations. In the drawings, the thickness of layers, films, panels, regions, etc., are exaggerated for clarity. The thickness of the layers, films, panels, regions, etc., is enlarged in the drawings for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

The term "in a plane view" means the case of viewing the object portion from the top, and the term "in a cross-sectional view" means the case of viewing a cross-section taken by vertically cutting the object portion from the side.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As used herein, the term "alkyl group" may refer to a group derived from a straight or branched chain saturated aliphatic hydrocarbon having the specified number of carbon atoms and having a valence of at least one.

As used herein, the term "alkenyl group" may refer to a straight or branched chain, monovalent hydrocarbon group having at least one carbon-carbon double bond.

As used herein, the term "alkylene group" may refer to a straight or branched saturated aliphatic hydrocarbon group having a valence of at least two, optionally substituted with one or more substituents where indicated, provided that the valence of the alkylene group is not exceeded.

A liquid crystal display according to an exemplary embodiment will now be described with reference to FIG. 1 and FIG. 2. FIG. 1 shows a top plan view of a pixel of a liquid crystal display according to an exemplary embodiment, and FIG. 2 shows a cross-sectional view of FIG. 1 with respect to a line II-II.

Figure 2:
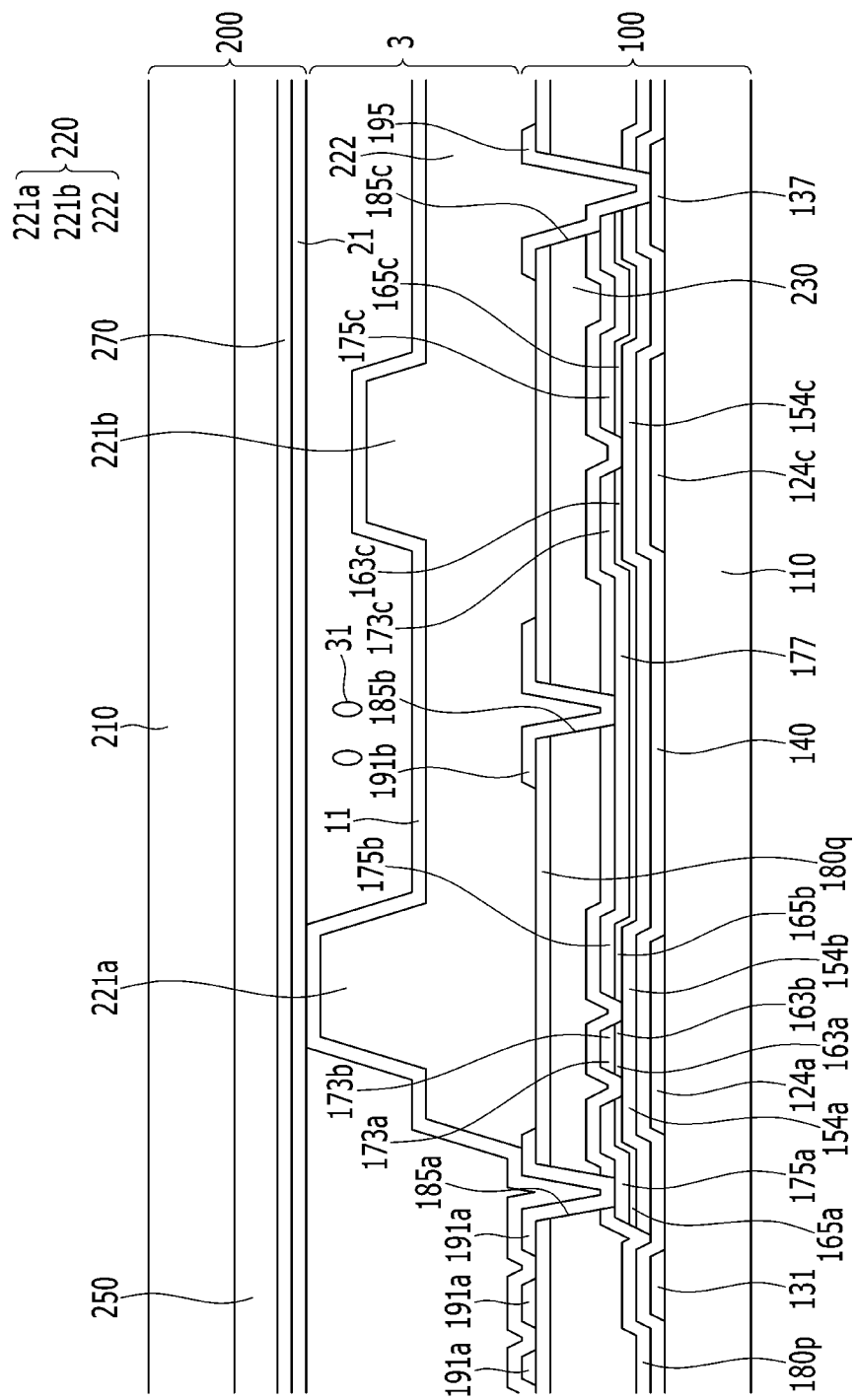
FIG. 2 shows a cross-sectional view of FIG. 1 with respect to a line II-II.

Referring to FIG. 1 and FIG. 2, the liquid crystal display includes a lower panel 100, an upper panel 200 facing the lower panel 100 with a gap therebetween, and a liquid crystal layer 3 provided between the lower panel 100 and the upper panel 200.

A liquid crystal composition constituting the liquid crystal layer 3 included in the liquid crystal display according to an exemplary embodiment will now be described.

In the present exemplary embodiment, the liquid crystal composition includes a liquid crystal compound represented by Formula 1.

Formula 1

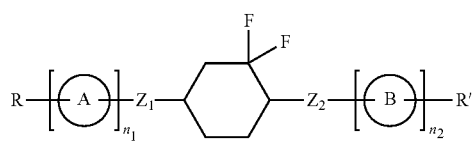

A is each independently one of formulae

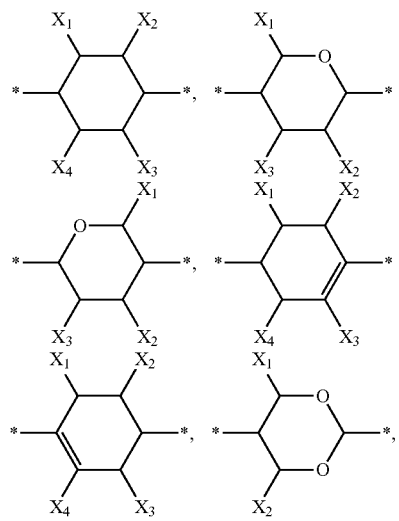

-continued

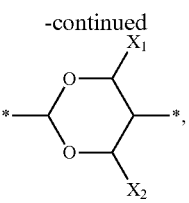

B is each independently one of formulae

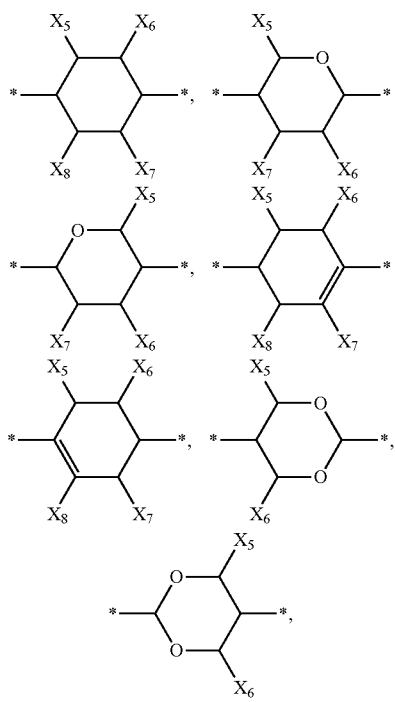

wherein

* indicates a binding site to a neighboring atom, $X_1$ to $X_8$ are each independently one of hydrogen (H), fluorine (F), chlorine (Cl), —$OCF_3$, —$CF_3$, —$CH_2F$, or —$CHF_2$, $Z_1$ and $Z_2$ are each independently one of —O(=O)O—, —OC(=O)—, —$CF_2$O—, —$OCF_2$—, —$CH_2$O—, —$OCH_2$—, —$SCH_2$—, —$CH_2$S—, —$C_2F_4$—, —$CH_2CF_2$—, —$CF_2CH_2$—, —$(CH_2)_z$— (wherein z is a natural number that is equal to or greater than 1 and equal to or less than 5), —CH=CH—, —CF=CF—, —CH=CF—, —CF=CH—, —CH=CHCH_2O—, or a single bond, R and R' are each independently one of a C1 to C12 alkyl group, hydrogen, a halogen, or a cyano group, and $n_1$ and $n_2$ are independently an integer between 0 and 5.

The amount of the liquid crystal compound represented by Formula 1 may be about 3 percent by weight (wt %) to about 20 wt % of the entire liquid crystal composition, and an appropriate content thereof may be included within the range so as to control a property of the liquid crystal composition.

In this instance, the liquid crystal compound represented by Formula 1 may include a liquid crystal compound represented by Formula 1-1, and without being restricted to this, the liquid crystal compound represented by Formula 1 may include other types of compounds.

Formula 1-1

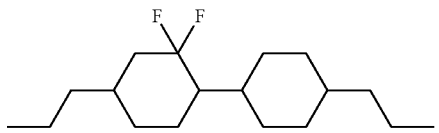 [SMILES: CCCC1CCC(C2CCC(CCC)CC2(F)F)CC1]

In this instance, the liquid crystal compound represented by Formula 1-1 has a phase-transition temperature is 31° C., dielectric anisotropy is −3.4, refractive anisotropy is 0.03, and rotational viscosity is 170 millipascal seconds (mPa·s).

The liquid crystal compound represented by Formula 1 has low viscosity, so it may improve a response speed of the liquid crystal composition. It also has an equivalent level of dielectric anisotropy to the dielectric anisotropy of the entire liquid crystal composition, so it may easily satisfy the property of matter required by the liquid crystal composition.

The liquid crystal composition according to an exemplary embodiment may further include at least one of the liquid crystal compounds represented by Formula 2 to Formula 21.

Formula 2

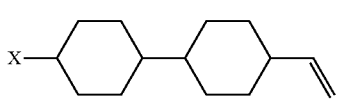

Formula 3

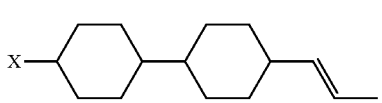

Formula 4

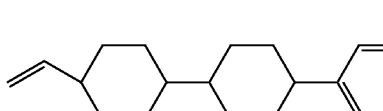

Formula 5

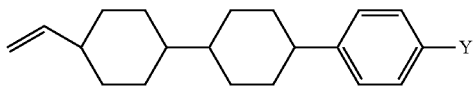

Formula 6

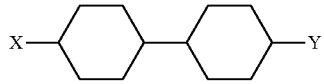

Formula 7

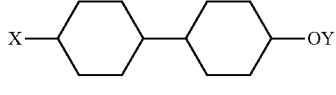

Formula 8

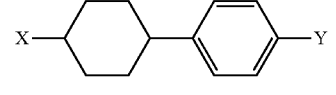

Formula 9

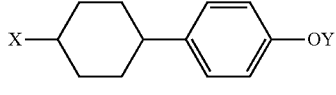

Formula 10

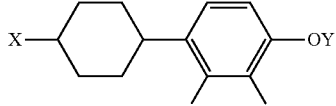

-continued

Formula 11
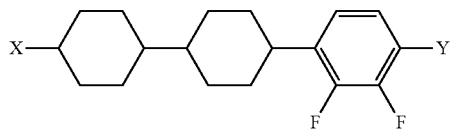

Formula 12
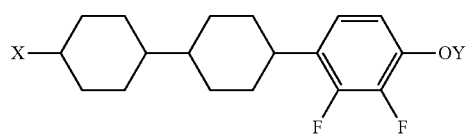

Formula 13
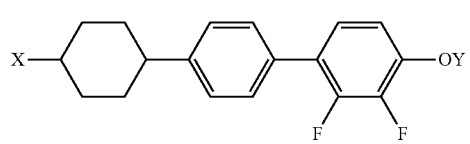

Formula 14
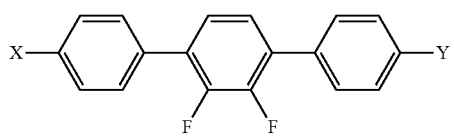

Formula 15

Formula 16
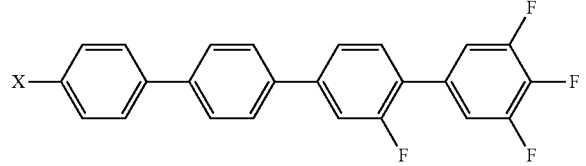

Formula 17
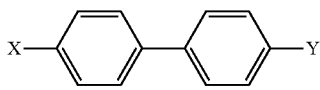

Formula 18
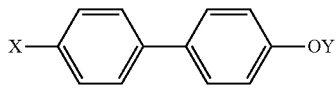

Formula 19
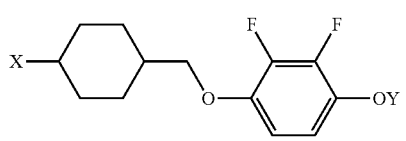

Formula 20
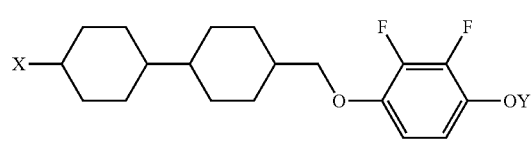

Formula 21
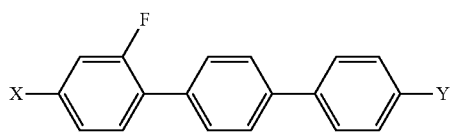

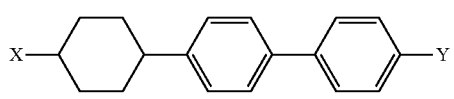

In the above formulae, the X and Y are an alkyl group ($C_nH_{2n+1}$), wherein n is independently a natural number of 1 to 5.

The amount of the liquid crystal compound represented by Formula 2 may be about 10 to about 30 wt % of the entire liquid crystal composition, the amount of the liquid crystal compound represented by Formula 3 may be about 5 to about 15 wt % of the entire liquid crystal composition, the amount of the liquid crystal compound represented by Formula 4 may be about 3 to about 10 wt % of the entire liquid crystal composition, the amount of the liquid crystal compound represented by Formula 5 may be about 10 to about 35 wt % of the entire liquid crystal composition, the amount of the liquid crystal compound represented by Formula 6 may be about 5 to about 15 wt % of the entire liquid crystal composition, the amount of the liquid crystal compound represented by Formula 7 may be about 5 to about 15 wt % of the entire liquid crystal composition, the amount of the liquid crystal compound represented by Formula 8 may be about 3 to about 25 wt % of the entire liquid crystal composition, the amount of the liquid crystal compound represented by Formula 9 may be about 5 to about 25 wt % of the entire liquid crystal composition, and the amount of the liquid crystal compound represented by Formula 10 may be about 5 to about 20 wt % of the entire liquid crystal composition. Further, the amount of the liquid crystal compound represented by Formula 11 may be about 5 to about 20 wt % of the entire liquid crystal composition, the amount of the liquid crystal compound represented by Formula 12 may be about 5 to about 25 wt % of the entire liquid crystal composition, the amount of the liquid crystal compound represented by Formula 13 may be about 5 to about 25 wt % of the entire liquid crystal composition, the amount of the liquid crystal compound represented by Formula 14 may be about 1 to about 15 wt % of the entire liquid crystal composition, and the amount of the liquid crystal compound represented by Formula 15 may be about 0.03 to about 5 wt % of the entire liquid crystal composition. Further, the amount of the liquid crystal compound represented by Formula 16 may be about 5 to about 15 wt % of the entire liquid crystal composition, the amount of the liquid crystal compound represented by Formula 17 may be about 5 to about 10 wt % of the entire liquid crystal composition, the amount of the liquid crystal compound represented by Formula 18 may be about 8 to about 16 wt % of the entire liquid crystal composition, the amount of the liquid crystal compound represented by Formula 19 may be about 10 to about 35 wt % of the entire liquid crystal composition, the amount of the liquid crystal compound represented by Formula 20 may be about 1 to about 10 wt % of the entire liquid crystal composition, and the amount of the liquid crystal compound represented by Formula 21 may be about 15 to about 20 wt % of the entire liquid crystal composition.

In summary, the amount of the liquid crystal compound represented by Formula 1 according to an exemplary embodiment may be about 3 to about 20 wt % of the entire liquid crystal composition, and at least one selected from the liquid crystal compounds represented by Formulae 2 to 20 may be included in the liquid crystal composition so as to satisfy the above-described content. The liquid crystal compositions have low rotational viscosity so they may be provided as liquid crystal compositions for the liquid crystal display with an improved response speed.

In this instance, dielectric anisotropy of the entire liquid crystal composition may be −2.8 to −5.5, refractive anisotropy may be 0.08 to 0.12, and rotational viscosity may be 70 to 140 mPa·s.

In addition, the liquid crystal composition according to an exemplary embodiment may further include a liquid crystal stabilizing agent including a compound represented by Formulae A-1 to A-28.

Formula A-1

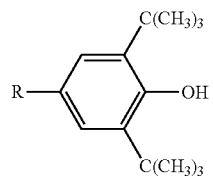

Formula A-2

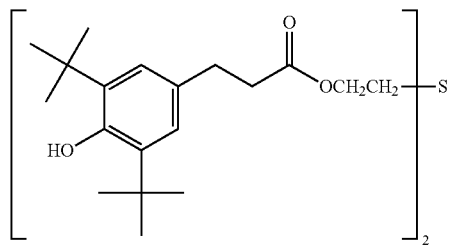

Formula A-3

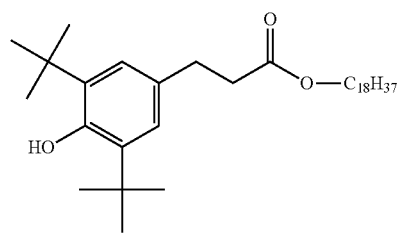

Formula A-4

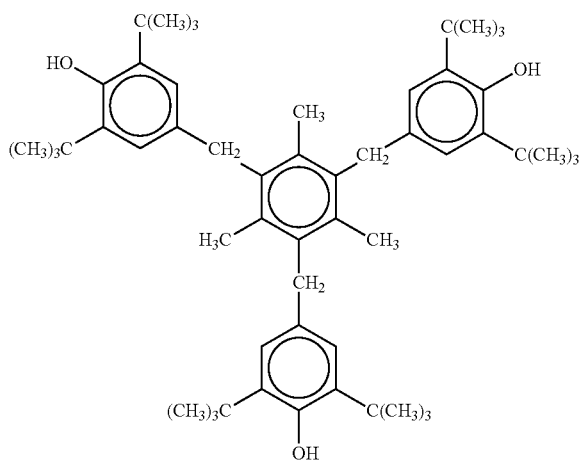

Formula A-5

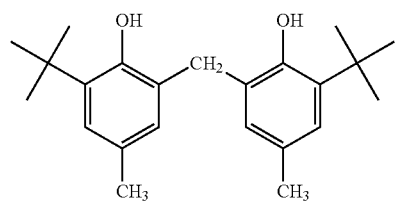

Formula A-6

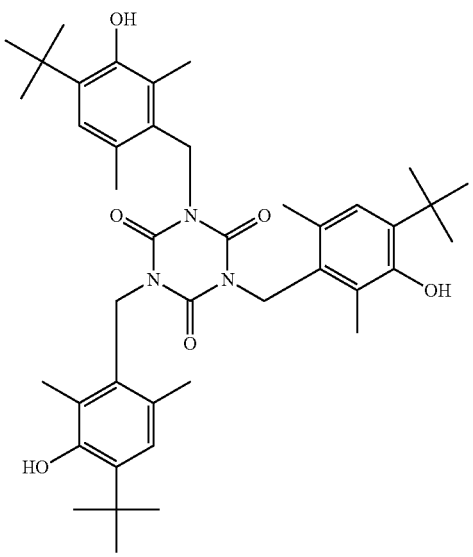

Formula A-7

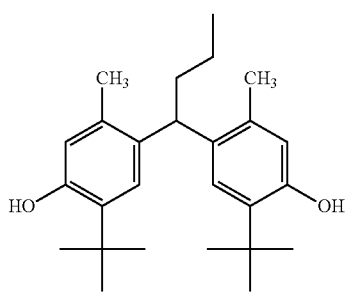

Formula A-8

-continued
Formula A-9
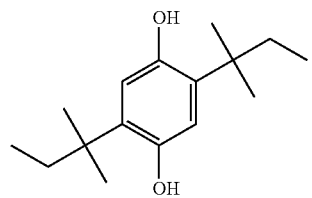
Formula A-10
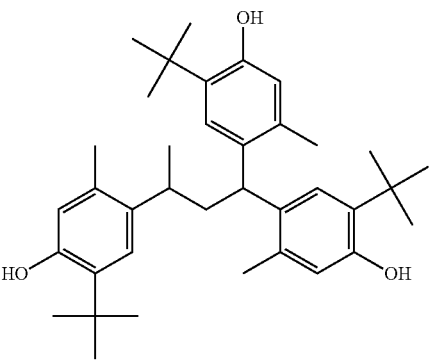
Formula A-11
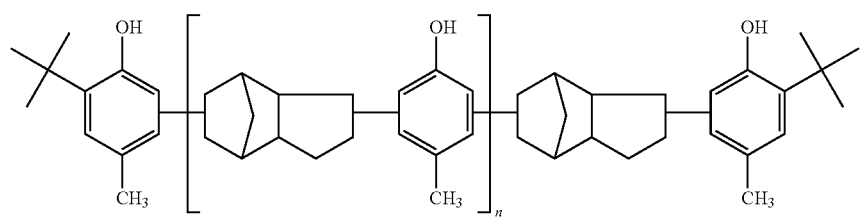
Formula A-12
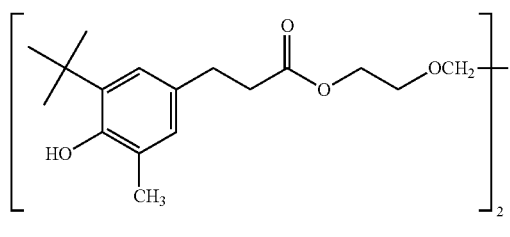
Formula A-13
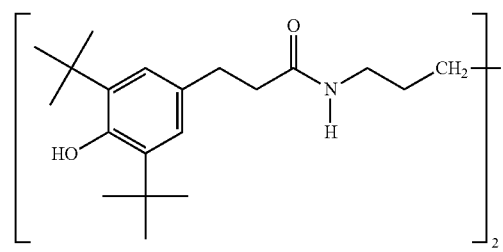
Formula A-14
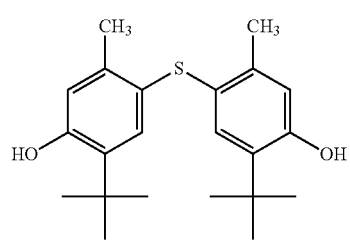
Formula A-15
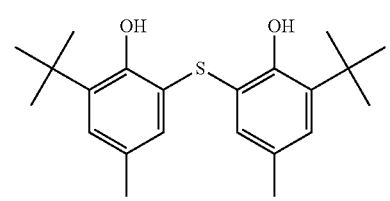
Formula A-16
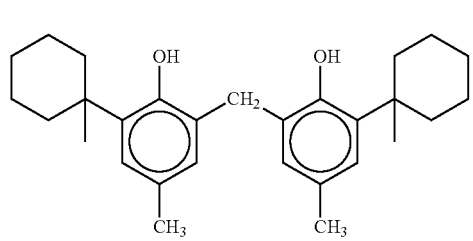
Formula A-17
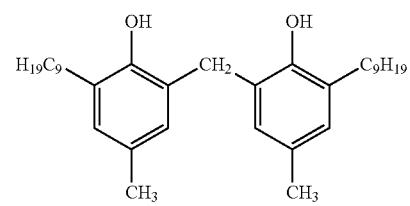
Formula A-18
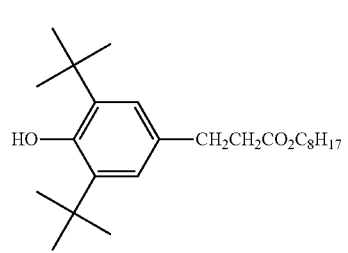
Formula A-19
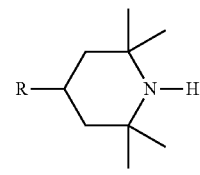

-continued

Formula A-20
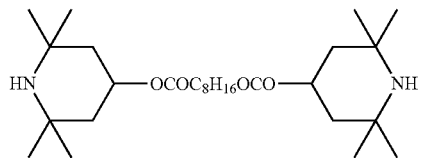

Formula A-21
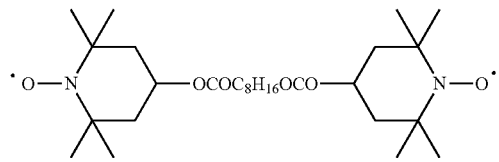

Formula A-22
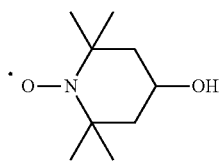

Formula A-23
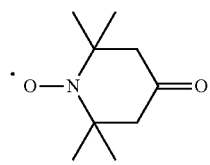

Formula A-24
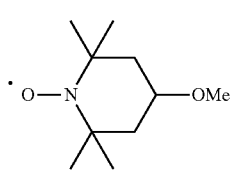

Formula A-25
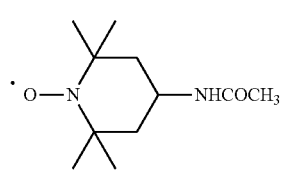

Formula A-26
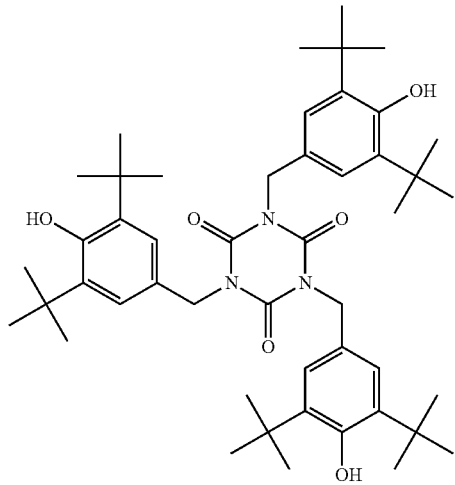

Formula A-27
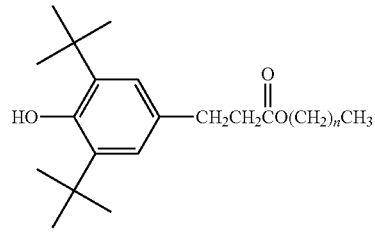

Formula A-28
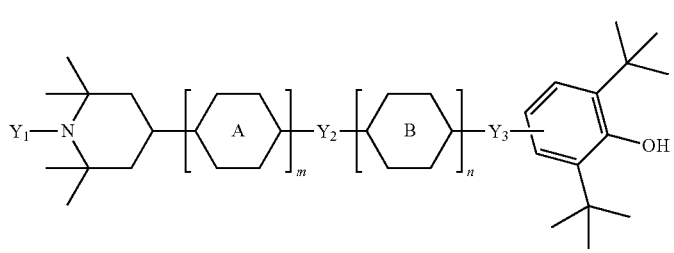

In the compound represented by Formula A-28, $Y_1$ is one of —H, —OR, or —R, $Y_2$ is one of —O—, —OC(=O)—, —OR'—, —R'O—, or —R'—, $Y_3$ is one of —O—, —OC(=O)—, —OR'—, —R'O—, or —R'—, A and B independently include one of a cyclohexylene group, a C3 to C7 cyclic ether group, or a phenylene group, R is a C1 to C5 alkyl group, R' is a C1 to C5 alkylene group, and m and n are independently an integer of 0 to 5, in the Formula A-1, R is a C1 to C10 alkyl group or a C2 to C10 alkenyl group, in the Formula A-11, n is an integer that is equal to or greater than 0 and is equal to or less than 5, in the Formula A-19, R is a C1 to C10 alkyl group or a C2 to C10 alkenyl group, and in the Formula A-27, n is a natural number of 1 to 15.

The compound represented by Formula A-28 may include a compound represented by Formula A-28' or Formula A-28".

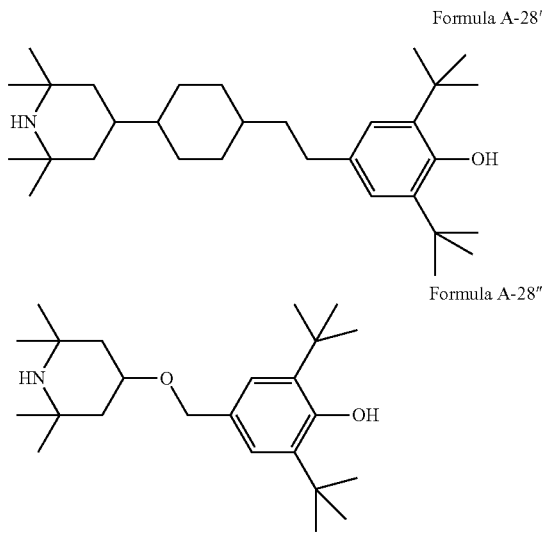

Formula A-28'

Formula A-28"

About 100 to about 500 parts per million (ppm) of a content of the liquid crystal stabilizing agent represented by Formulae A-1 to A-28 may be included in the entire liquid crystal composition.

The liquid crystal compound represented by Formulae A-1 to A-28 may control a reaction of liquid crystal molecules caused by ultra-violet (UV) rays or heat, or may be combined with unstable radicals generated by oxidization.

Hence, free radicals become extinct to prevent a continuous oxidation reaction.

Due to the presence of the liquid crystal stabilizing agent, the radicals generated by a light unit are dissipated and a reliability of the liquid crystal composition may be improved without influencing a characteristic of the liquid crystal composition. Also, generation of pre-afterimages or stains generated in the liquid crystal display may be controlled.

The above-described liquid crystal composition includes a liquid crystal compound indicating low rotational viscosity in order to provide an improved response speed, and further includes a liquid crystal stabilizing agent, thereby improving the stability of the liquid crystal composition.

Referring to FIG. 1 and FIG. 2, constituent elements of a liquid crystal display including the above-described liquid crystal composition will be described in detail.

The lower panel 100 will now be described.

A gate conductor including a gate line 121 and a reference voltage line 131 is provided on a first substrate 110.

The gate line 121 includes a first gate electrode 124a, a second gate electrode 124b, and a third gate electrode 124c. The reference voltage line 131 includes first storage electrodes 135 and 136 and a reference electrode 137. Although not connected to the reference voltage line 131, second storage electrodes 138 and 139 may be provided to overlap a second subpixel electrode 191b.

A gate insulating layer 140 is provided on the gate line 121 and the reference voltage line 131.

A first semiconductor layer 154a, a second semiconductor layer 154b, and a third semiconductor layer 154c are provided on the gate insulating layer 140. Ohmic contacts 163a, 165a, 163b, 165b, 163c, and 165c may be provided on the first, second, and third semiconductor layers 154a, 154b, and 154c.

A data conductor including a data line 171 connected to a first source electrode 173a and a second source electrode 173b, a first drain electrode 175a, a second drain electrode 175b, a third source electrode 173c, and a third drain electrode 175c are provided on the ohmic contacts 163a, 165a, 163b, 165b, 163c, and 165c and the gate insulating layer 140.

The first gate electrode 124a, the first source electrode 173a, and the first drain electrode 175a configure a first thin film transistor Qa with the first semiconductor layer 154a; the second gate electrode 124b, the second source electrode 173b, and the second drain electrode 175b configure a second thin film transistor Qb with the second semiconductor layer 154b; and the third gate electrode 124c, the third source electrode 173c, and the third drain electrode 175c configure a third thin film transistor Qc with the third semiconductor layer 154c.

The second drain electrode 175b is connected to the third source electrode 173c, and may include an extension 177.

A first passivation layer 180p is provided on the data conductors 171, 173c, 175a, 175b, and 175c and the semiconductor layers 154a, 154b, and 154c. The first passivation layer 180p may include an inorganic insulating layer such as a silicon nitride or a silicon oxide.

A color filter 230 is provided on the first passivation layer 180p. The color filter 230 extends in a vertical direction along two adjacent data lines 171. The color filter 230 has been described to be provided on the lower panel 100 in an exemplary embodiment, and the color filter 230 may be provided on the upper panel 200 and not on the lower panel 100 as an exemplary variation.

A second passivation layer 180q is provided on the color filter 230. The second passivation layer 180q may include an inorganic insulating layer such as a silicon nitride or a silicon oxide in a like manner of the first passivation layer 180p.

The second passivation layer 180q prevents defects such as an afterimage that may be generated when a screen is driven by preventing the color filter 230 from disconnection and preventing the liquid crystal layer 3 from contamination caused by an organic material such as a solvent provided by the color filter 230.

A first contact hole 185a and a second contact hole 185b may be formed in the first passivation layer 180p, the color filter 230, and the second passivation layer 180q, and the first drain electrode 175a and the second drain electrode 175b may be electrically connected to a first subpixel electrode 191a and a second subpixel electrode 191b through the first contact hole 185a and the second contact hole 185b.

A third contact hole 185c is formed in the first passivation layer 180p, the color filter 230, the second passivation layer 180q, and the gate insulating layer 140, and a connecting member 195 is formed in the third contact hole 185c. The connecting member 195 may electrically connect the reference electrode 137 and the third drain electrode 175c.

A plurality of pixel electrodes 191 are provided on the second passivation layer 180q. The pixel electrodes 191 are field generating electrodes, they are separated from each other with a gate line 121 provided therebetween, and they include a first subpixel electrode 191*a* and a second subpixel electrode 191*b* neighboring in a column direction with respect to the gate line 121.

The pixel electrodes 191 may be formed of a transparent material such as an ITO and an IZO.

The first subpixel electrode 191*a* and the second subpixel electrode 191*b* are quadrangular and respectively include a cross-shaped stem including a horizontal stem 193 and a vertical stem 192 crossing the horizontal stem 193. Further, the first subpixel electrode 191*a* and the second subpixel electrode 191*b* are respectively divided into a first subregion (Da), a second subregion (Db), a third subregion (Dc), and a fourth subregion (Dd) by the horizontal stem 193 and the vertical stem 192, and respectively include a plurality of fine branches 194 provided on the subregions (Da to Dd).

The first subpixel electrode 191*a* and the second subpixel electrode 191*b* receive a data voltage from the first drain electrode 175*a* or the second drain electrode 175*b*. In this instance, part of the data voltage applied to the second drain electrode 175*b* is divided through the third source electrode 173*c* so the voltage applied to the first subpixel electrode 191*a* becomes greater than the voltage applied to the second subpixel electrode 191*b*.

The first subpixel electrode 191*a* and the second subpixel electrode 191*b* to which the data voltage is applied generate an electric field with the common electrode 270 of the upper panel 200 to determine a direction of the liquid crystal molecules 31 of the liquid crystal layer 3 between the electrodes 191 and 270. Luminance of light passing through the liquid crystal layer 3 is changed by the determined direction of the liquid crystal molecule 31.

The above description of the thin film transistor and the pixel electrode 191 is an example, and the configuration of the thin film transistor and the design of the pixel electrode may be modifiable so as to improve lateral visibility.

A light blocking member 220 is provided on the pixel electrode 191. The light blocking member 220 is also referred to as a black matrix. The light blocking member 220 may include a light blocker 222, a first spacer 221*a*, and a second spacer 221*b*.

The light blocker 222 mostly overlap the first to third thin film transistors Qa, Qb, and Qc, and may have a substantially flat upper side. The light blocker 222 may block leakage of light in the region where the thin film transistor is provided.

The first spacer 221*a* and the second spacer 221*b* may be connected to the light blocker 222, and may be protruded from the upper side of the light blocker 222. The first spacer 221*a* and the second spacer 221*b* may be provided to overlap the first to third thin film transistors Qa, Qb, and Qc and/or signal lines such as the gate line 121, the reference voltage line 131, and the data line 171.

The first spacer 221*a* may be a main column spacer, and the second spacer 221*b* may be a sub-column spacer. The first spacer 221*a* as a main column spacer may generally maintain and support a cell gap between the upper panel 200 and the lower panel 100. The second spacer 221*b* as a sub-column spacer may maintain and support the cell gap between the upper panel 200 and the lower panel 100 when a distance between the upper panel 200 and the lower panel 100 is reduced by an external pressure.

The light blocking member 220 may include a pigment such as black carbon, and may include an organic material with photosensitivity.

It has been described and illustrated in the present specification that the light blocking member includes a spacer according to an exemplary embodiment, and without being limited to this description and illustration, the light blocking member and the spacer may be separately formed and provided.

It has been described and illustrated in the present specification that the light blocking member is provided on the lower panel 100 according to an exemplary embodiment, and without being limited to this description and illustration, it may be provided on the upper panel 200.

A first alignment layer 11 is provided on the pixel electrode 191, and the first alignment layer 11 may be a vertical alignment layer. The first alignment layer 11 may be formed to include at least one selected from general materials (e.g., polyamic acid or polyimide) used as a liquid crystal alignment layer.

The upper panel 200 will now be described.

The second substrate 210 is provided to overlap the first substrate 110 with a gap therebetween.

An overcoat 250 is provided between the second substrate 210 and the liquid crystal layer 3. The overcoat 250 may be omitted according to the exemplary embodiments.

A common electrode 270, one of the field generating electrodes, is provided between the overcoat 250 and the liquid crystal layer 3. The common electrode 270 generates an electric field together with the pixel electrode 191 of the lower panel 100 to determine the direction of the liquid crystal molecules 31 of the liquid crystal layer 3.

A second alignment layer 21 is provided between the common electrode 270 and the liquid crystal layer 3, and the second alignment layer 21 may be a vertical alignment layer. The second alignment layer 21 may be formed of the same material as the first alignment layer 11.

A liquid crystal layer 3 is provided between the first alignment layer 11 and the second alignment layer 21. The liquid crystal layer 3 has negative dielectric anisotropy, and may include a liquid crystal composition with dielectric anisotropy according to an exemplary embodiment. A long axis of the liquid crystal molecules 31 of the liquid crystal layer 3 is aligned to be perpendicular with respect to surfaces of the display panels 100 and 200 while there is no electric field.

The liquid crystal layer 3 of the display device according to an exemplary embodiment may include a compound such as a monomer hardened by a polymerization reaction caused by light such as ultraviolet rays. The compound may be a reactive mesogen generating a polymerization reaction by light such as ultraviolet rays.

The reactive mesogen may form a polymer when a polymerization reaction is performed during a manufacturing process, and the liquid crystal molecules 31 are aligned to have a pretilt by the polymer. The reactive mesogen may be provided near the alignment layers 11 and 21, they may extend from an internal portion of the alignment layers 11 and 21 according to exemplary embodiments, and they may be omitted according to other exemplary embodiments.

According to the above-noted display device, a viewing angle is acquired to provide excellent display quality and have an improved response speed.

Figure 3:
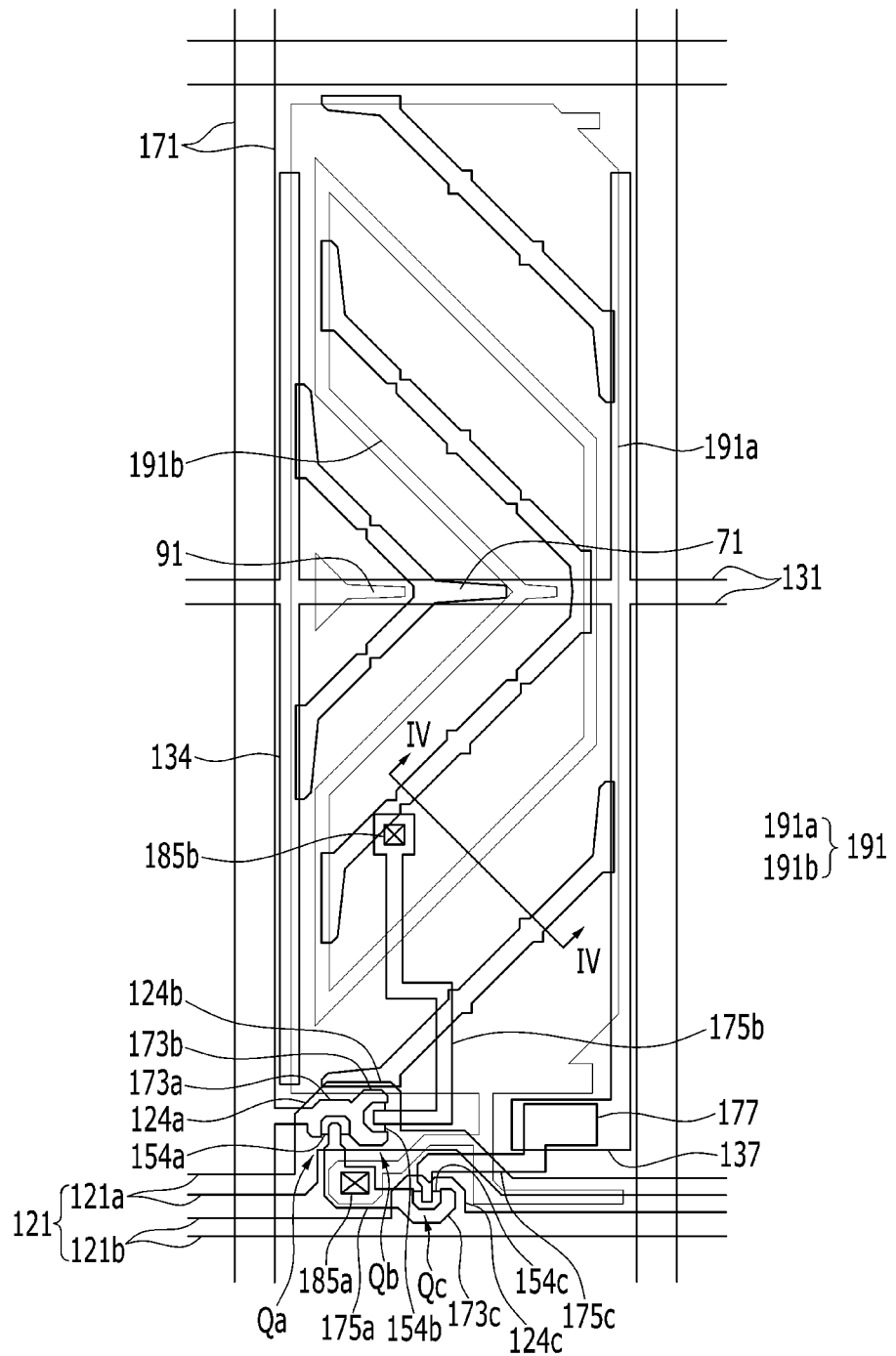
FIG. 3 shows a top plan view of a pixel of a liquid crystal display according to an exemplary embodiment.
Figure 4:
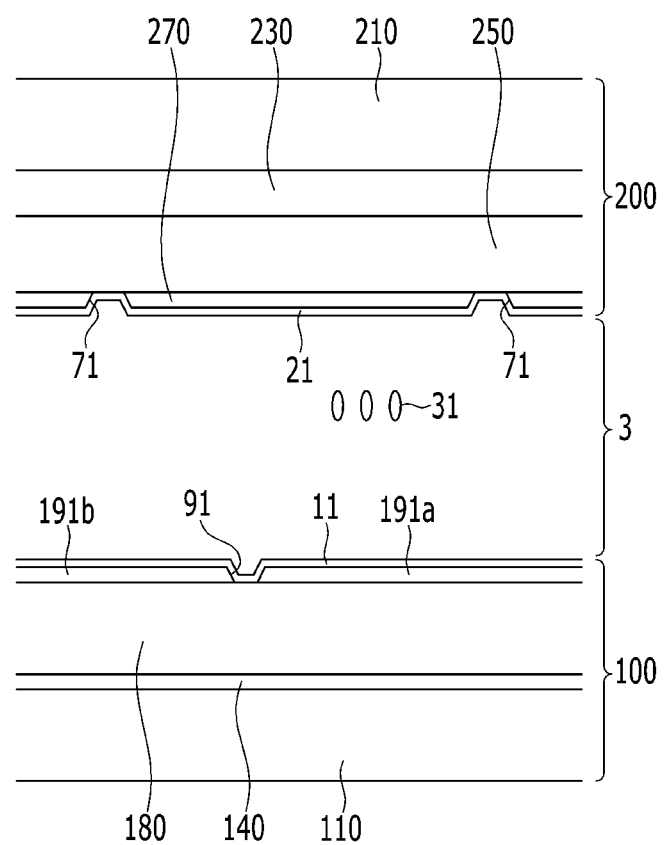
FIG. 4 shows a cross-sectional view of FIG. 3 with respect to a line IV-IV.

A liquid crystal display according to an exemplary embodiment with a modified configuration of the pixel electrode 191 of FIG. 1 and FIG. 2 will be described with reference to FIG. 3 and FIG. 4. FIG. 3 shows a top plan view of a pixel of a liquid crystal display according to an exemplary embodiment, and FIG. 4 shows a cross-sectional view of FIG. 3 with respect to a line IV-IV.

The lower panel 100 will now be described.

A plurality of gate lines 121 including a first gate line 121a and a second gate line 121b and a plurality of reference voltage lines 131 are provided on a first substrate 110.

The first gate line 121a includes a first gate electrode 124a and a second gate electrode 124b protruding upward, and the second gate line 121b includes a third gate electrode 124c.

The reference voltage line 131 mainly extends in the horizontal direction, and includes a pair of vertical portions 134 and a reference electrode 137 protruding to extend from the vertical portions 134.

A gate insulating layer 140 is provided on the gate line 121 and the reference voltage line 131. The first and second semiconductor layers 154a and 154b are provided to overlap the first and second gate electrodes 124a and 124b, and the third semiconductor layer 154c is provided on the third gate electrode 124c.

A data conductor including a data line 171, a first drain electrode 175a, a second drain electrode 175b, and a third drain electrode 175c is provided on the gate insulating layer 140 and the semiconductor layers 154a, 154b, and 154c.

The data line 171 includes a first source electrode 173a and a second source electrode 173b. The first source electrode 173a and the second source electrode 173b face the first drain electrode 175a and the second drain electrode 175b with respect to the first gate electrode 124a and the second gate electrode 124b.

A wide extension 177 of the third drain electrode 175c overlaps the reference electrode 137 to configure a stepdown capacitor, and a bar-type end portion is partly surrounded with the third source electrode 173c.

The first gate electrode 124a, the first source electrode 173a, and the first drain electrode 175a form a first thin film transistor Qa together with the first semiconductor layer 154a; the second gate electrode 124b, the second source electrode 173b, and second drain electrode 175b form a second thin film transistor Qb together with the second semiconductor layer 154b; and the third gate electrode 124c, the third source electrode 173c, and the third drain electrode 175c form a third thin film transistor Qc together with the third semiconductor layer 154c.

A passivation layer 180 is provided on the data conductors 171, 173a, 173b, 173c, 175a, 175b, and 175c and exposed first, second, and third semiconductor layers 154a, 154b, and 154c. The passivation layer 180 may include a plurality of contact holes 185a and 185b overlapping with the first drain electrode 175a and the second drain electrode 175b.

A pixel electrode 191 including a first subpixel electrode 191a and a second subpixel electrode 191b is provided on the passivation layer 180.

The pixel electrode 191 includes a plurality of cutouts 91, and the pixel electrode 191 may be divided into a plurality of partitions by the cutouts 91.

The number of pixel electrode partitions or the number of cutouts are changeable by design factors such as a size of the pixel electrode 191, a length ratio of a horizontal side and a vertical side of the pixel electrode 191, and a type or a characteristic of the liquid crystal layer 3.

The first subpixel electrode 191a and the second subpixel electrode 191b are connected to the first drain electrode 175a and the second drain electrode 175b through the contact holes 185a and 185b, and receive a data voltage from the first drain electrode 175a and the second drain electrode 175b.

The first subpixel electrode 191a and the second subpixel electrode 191b to which the data voltage is applied generate an electric field with the common electrode 270 of the upper panel 200 to determine the direction of the liquid crystal molecules 31 of the liquid crystal layer 3 between the two electrodes. When the electric field is not present, liquid crystal molecules of the liquid crystal layer aligned to be perpendicular to the surfaces of the two electrodes lie in the horizontal direction with respect to the surfaces of the two electrodes, and luminance of the light passing through the liquid crystal layer becomes different according to the lying degree of the liquid crystal molecules.

The upper panel 200 will now be described.

A light blocking member (not shown) is provided between a second substrate 210 overlapping a first substrate 110 and a liquid crystal layer.

The light blocking member provided on the upper panel 200 is described in the present specification, and without being restricted to this description, it may be provided on the lower panel 100. Further, the light blocking member may include a column spacer as described with reference to FIG. 1 and FIG. 2.

A color filter 230 is provided between the second substrate 210 and the liquid crystal layer 3. In an exemplary variation of the present exemplary embodiment, the color filter 230 or the light blocking member may be provided on the lower panel 100.

An overcoat 250 is provided between the color filter 230 and the liquid crystal layer 3. The overcoat 250 may be made of an insulator, it prevents the color filter 230 from being exposed, and it provides a flat side. The overcoat 250 may be omitted.

A common electrode 270 is provided between the overcoat 250 and the liquid crystal layer 3. The common electrode 270 is made of a transparent conductor such as an ITO or an IZO, and it may include a plurality of cutouts 71.

The cutouts 71 may be provided between a plurality of cutouts 91 of the pixel electrode 191. The cutout 91 of the pixel electrode 191 and the cutout 71 of the common electrode 270 divide the pixel electrode 191 into a plurality of sub-partitions, and when the direction in which the liquid crystal molecules 31 are inclined are diversified, a reference viewing angle of the liquid crystal display increases.

Alignment layers 11 and 21 are provided between the lower panel 100 and the liquid crystal layer 3 or between the upper panel 200 and the liquid crystal layer 3, and they may be vertical alignment layers or photoalignment layers.

The liquid crystal layer 3 is provided between the lower panel 100 and the upper panel 200. The liquid crystal composition included by the liquid crystal layer 3 corresponds to the above-described liquid crystal composition and will not be described.

Figure 5:
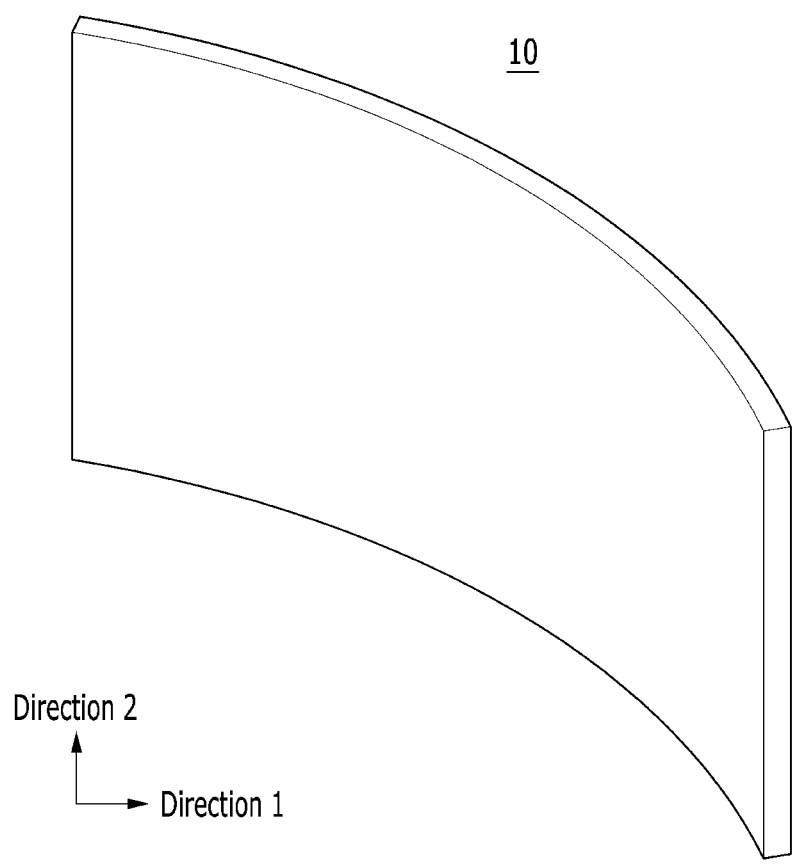
FIG. 5 shows a perspective view of a liquid crystal display according to an exemplary embodiment.

A liquid crystal display according to an exemplary embodiment will now be described with reference to FIG. 5 and FIG. 6. FIG. 5 shows a perspective view of a liquid crystal display according to an exemplary embodiment showing a curved liquid crystal display and FIG. 6 shows a cross-sectional view of constituent elements according to an exemplary embodiment of FIG. 5.

As shown in FIG. 5, the liquid crystal display 10 may be curved. The liquid crystal display 10 may be curved in the horizontal direction and the first direction, or it may be curved in the vertical direction and the second direction. The present specification described the curved liquid crystal display 10 bent in a long-axis direction, and without being limited to this, it is also applicable to the liquid crystal display curved in a short-axis direction or a flat panel display.

Figure 6:
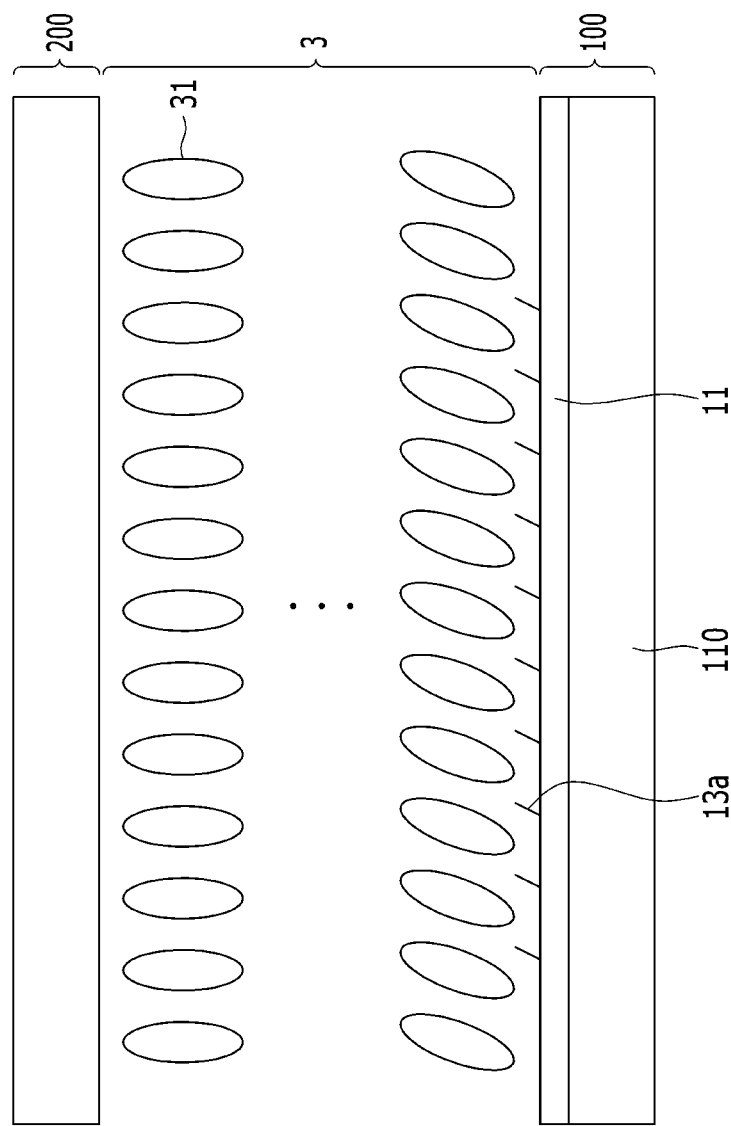
FIG. 6 shows a cross-sectional view of constituent elements according to an exemplary embodiment of FIG. 5.

Referring to FIG. 6, a lower panel 100 of the liquid crystal display 10 of FIG. 5 includes a first alignment layer 11 provided on a first substrate 110. In this instance, liquid crystal molecules 31 adjacent to the first alignment layer 11 may have a pretilt. In detail, an aligning polymer 13a included in at least one selected from the first alignment layer 11 and the liquid crystal layer 3 may tilt the adjacent liquid crystal molecules 31.

In the present exemplary embodiment, the pretilt may represent a tilted degree of the liquid crystal molecules 31 with respect to the direction that is perpendicular to a surface of the first alignment layer 11.

The upper panel 200 faces the lower panel 100 and overlaps the same. In this instance, the liquid crystal molecules 31 provided near the upper panel 200 may not have a pretilt.

The liquid crystal layer 3 provided between the lower panel 100 and the upper panel 200 has negative dielectric anisotropy, and corresponds to the above-described liquid crystal composition, so the liquid crystal composition will not be described.

Between the lower panel 100 and the upper panel 200 facing each other, when the flat display panel, in which the liquid crystal molecules 31 form a pretilt in a like direction is bent, a region where a pretilt direction of the liquid crystal molecules 31 that are adjacent to the lower panel 100 does not correspond to a pretilt direction of the liquid crystal molecules 31 that are adjacent to the upper panel 200 may be generated. The region may be generated on an edge of neighboring domains. In the region, the direction in which the liquid crystal molecules 31 are inclined generates a problem to cause a texture defect. However, the liquid crystal display including an arrangement structure of the above-described liquid crystal molecules 31 generates no arrangement direction mismatch between the liquid crystal molecules 31 that are adjacent to the lower panel 100 and the liquid crystal molecules 31 that are adjacent to the upper panel 200 when the upper and lower panels are misaligned, so it may control generation of texture.

Other configurations for differentiating the pretilt degree of the liquid crystal molecules 31 that are adjacent to the lower panel 100 and the pretilt degree of the liquid crystal molecules 31 that are adjacent to the upper panel 200 are allowable.

For example, the upper panel 200 according to the present exemplary embodiment may not include an additional alignment layer and the lower panel 100 may include an alignment layer 11 including a photo-reactive group. The photo-reactive group of the alignment layer 11 and an alignment aid of the liquid crystal layer 3 may be combined to generate an aligning polymer 13a during a manufacturing process, so that the liquid crystal molecules 31 that are adjacent to the alignment layer 11 may be pretilted.

Further, the upper panel 200 does not include an additional alignment layer, but it may vertically align the liquid crystal molecules 31 that are adjacent to the upper panel 200 according to a vertical alignment additive included in the liquid crystal layer 3.

Without being limited to this description, an exemplary embodiment in which the lower panel 100 and the upper panel 200 respectively include an alignment layer is allowable. In this instance, it is also possible for the alignment layer included by the lower panel 100 to include a photo-reactive group and form an aligning polymer 13a or the alignment layer included by the upper panel 200 to include a photo-stabilizer and control formation of the aligning polymer 13a as another exemplary embodiment. In addition to the above-noted method, other methods for differentiating the pretilt degree on the liquid crystal molecules 31 between the lower panel 100 and the upper panel 200 are usable.

According to the curved liquid crystal display, the texture defect may be prevented and the display device with an improved response speed may be provided.

A degree of estimating properties and performance of a liquid crystal composition according to an exemplary embodiment and a comparative embodiment will now be described with reference to Table 1 to Table 6 and FIG. 7 to FIG. 11. Table 1 displays a liquid crystal composition according to an exemplary embodiment and includes about 300 ppm of a liquid crystal stabilizing agent represented by Formula A-1, Table 2 displays a liquid crystal composition according to Comparative Embodiment 1, Table 3 is a liquid crystal composition according to Comparative Embodiment 2, Table 4 is a liquid crystal composition according to Comparative Embodiment 3, and the comparative embodiments shown in Table 2 to Table 4 do not include the liquid crystal stabilizing agent represented by Formula A-1.

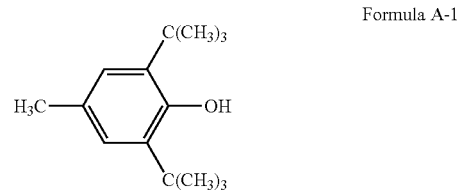

Formula A-1

TABLE 1

| Liquid crystal compound | Content (wt %) |
|---|---|
| 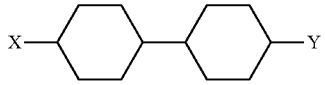 | 11 |
| 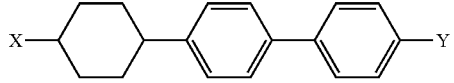 | 19 |
| 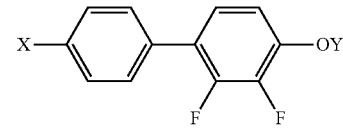 | 16 |
| 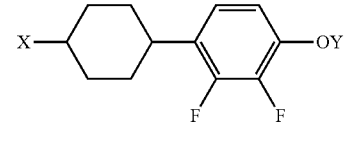 | 20 |
| 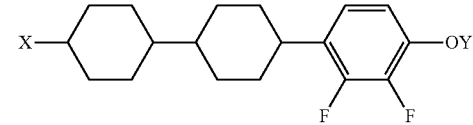 | 16.5 |

TABLE 1-continued

| Liquid crystal compound | Content (wt %) |
|---|---|
| X—[Cy]—[Cy]—[Ph(F,F)]—Y | 6 |
| [Cy(F,F)]—[Cy] with alkyl chains | 11.5 |

TABLE 2

| Liquid crystal compound | Content (wt %) |
|---|---|
| X—[Cy]—[Cy]—Y | 11 |
| X—[Cy]—[Ph]—[Ph]—Y | 19 |
| X—[Ph]—[Ph(F,F)]—OY | 16 |
| X—[Cy]—[Ph(F,F)]—OY | 20 |
| X—[Cy]—[Cy]—[Ph(F,F)]—OY | 16.5 |
| X—[Cy]—[Cy]—[Ph(F,F)]—Y | 6 |
| [Cy(F,F)]—[Cy] with alkyl chains | 11.5 |

TABLE 3

| Liquid crystal compound | Content (wt %) |
|---|---|
| X—[Cy]—[Cy]—Y | 11 |

TABLE 3-continued

| Liquid crystal compound | Content (wt %) |
|---|---|
| X—[Cy]—[Ph]—OY | 2 |
| X—[Cy]—[Ph]—[Ph]—Y | 19 |
| X—[Ph]—[Ph(F,F)]—OY | 15.5 |
| X—[Cy]—[Ph(F,F)]—OY | 18 |
| X—[Cy]—[Cy]—[Ph(F,F)]—OY | 16 |
| X—[Cy]—[Cy]—[Ph(F,F)]—Y | 6 |
| [Cy(F,F)]—[Cy] with alkyl chains | 12.5 |

TABLE 4

| Liquid crystal compound | Content (wt %) |
|---|---|
| X—[Cy]—[Cy]—Y | 31 |
| X—[Cy]—[Ph]—OY | 7 |
| X—[Cy]—[Ph(F,F)]—OY | 15 |
| X—[Cy]—[Cy]—[Ph(F,F)]—OY | 14.5 |

TABLE 4-continued

| Liquid crystal compound | Content (wt %) |
|---|---|
| 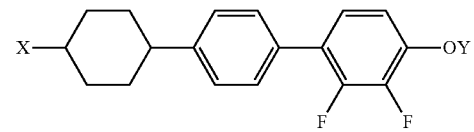 | 18 |
| 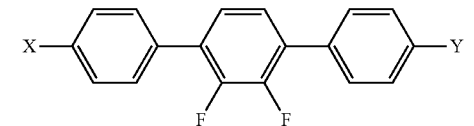 | 14.5 |

In this instance, the liquid crystal according to an exemplary embodiment has a phase transition temperature of 75° C., refractive anisotropy of 0.1096, dielectric anisotropy of −3.6, and rotational viscosity of 138 mPa·s. The liquid crystal composition according to the Comparative Embodiment 1 has a phase transition temperature of 75° C., refractive anisotropy of 0.1096, dielectric anisotropy of −3.6, and rotational viscosity of 138 mPa·s. The liquid crystal composition according to the Comparative Embodiment 2 has a phase transition temperature of 76.1° C., refractive anisotropy of 0.1095, dielectric anisotropy of −3.4, and rotational viscosity of 133 mPa·s. The liquid crystal composition according to the Comparative Embodiment 3 has a phase transition temperature of 75° C., refractive anisotropy of 0.1075, dielectric anisotropy of −3.0, and rotational viscosity of 115 mPa·s.

Figure 7:
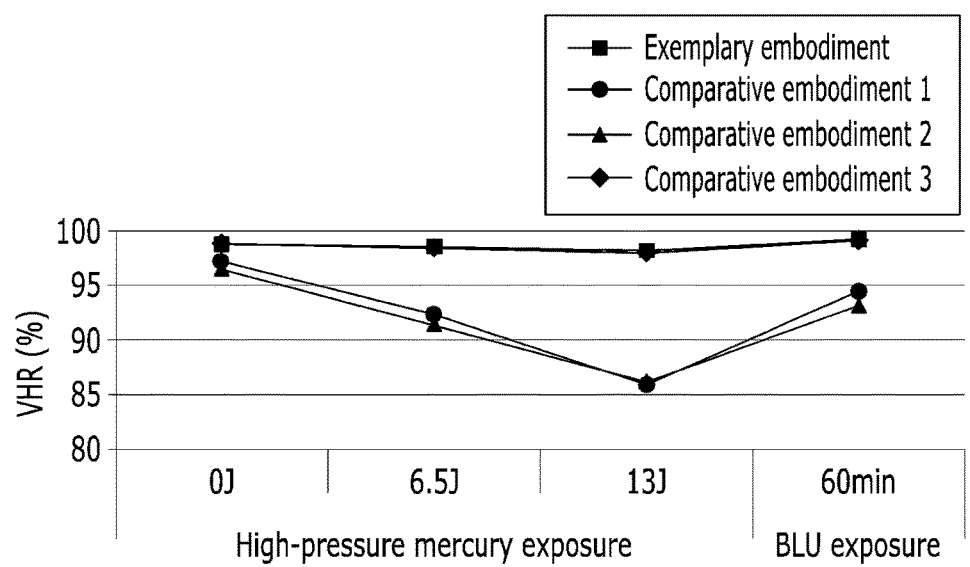
FIG. 7 shows a reliability graph of voltage holding ratio (percent, %) versus high-pressure mercury exposure (joules, J) and light unit exposure (minutes, min) in an exemplary embodiment and comparative embodiments.
Figure 8:
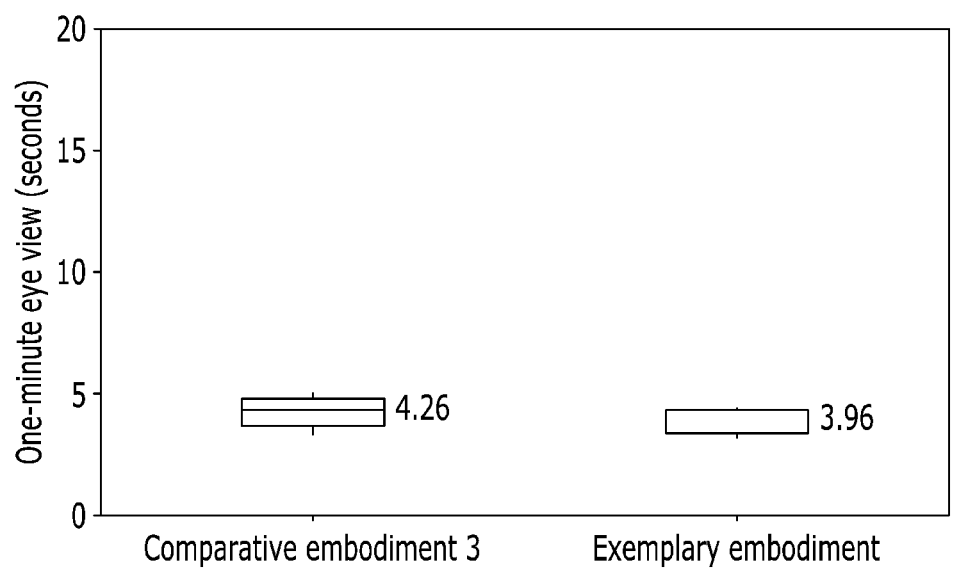
FIG. 8 shows a graph of an instant afterimage illustrating one-minute eye view (seconds, s) according to an exemplary embodiment and a comparative embodiment.
Figure 9:
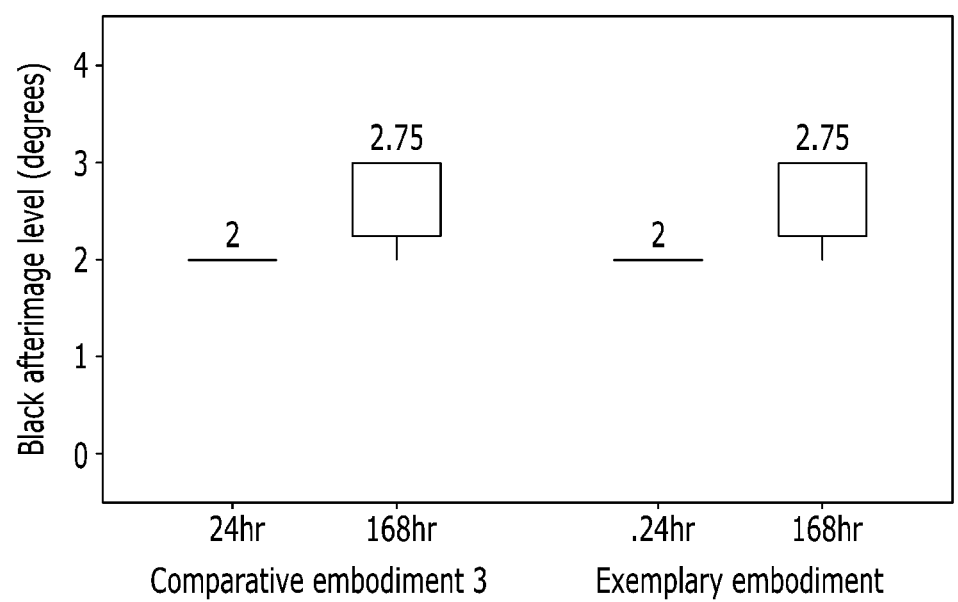
FIG. 9 shows a graph of a black afterimage level (degrees) according to an exemplary embodiment and a comparative embodiment.
Figure 10:
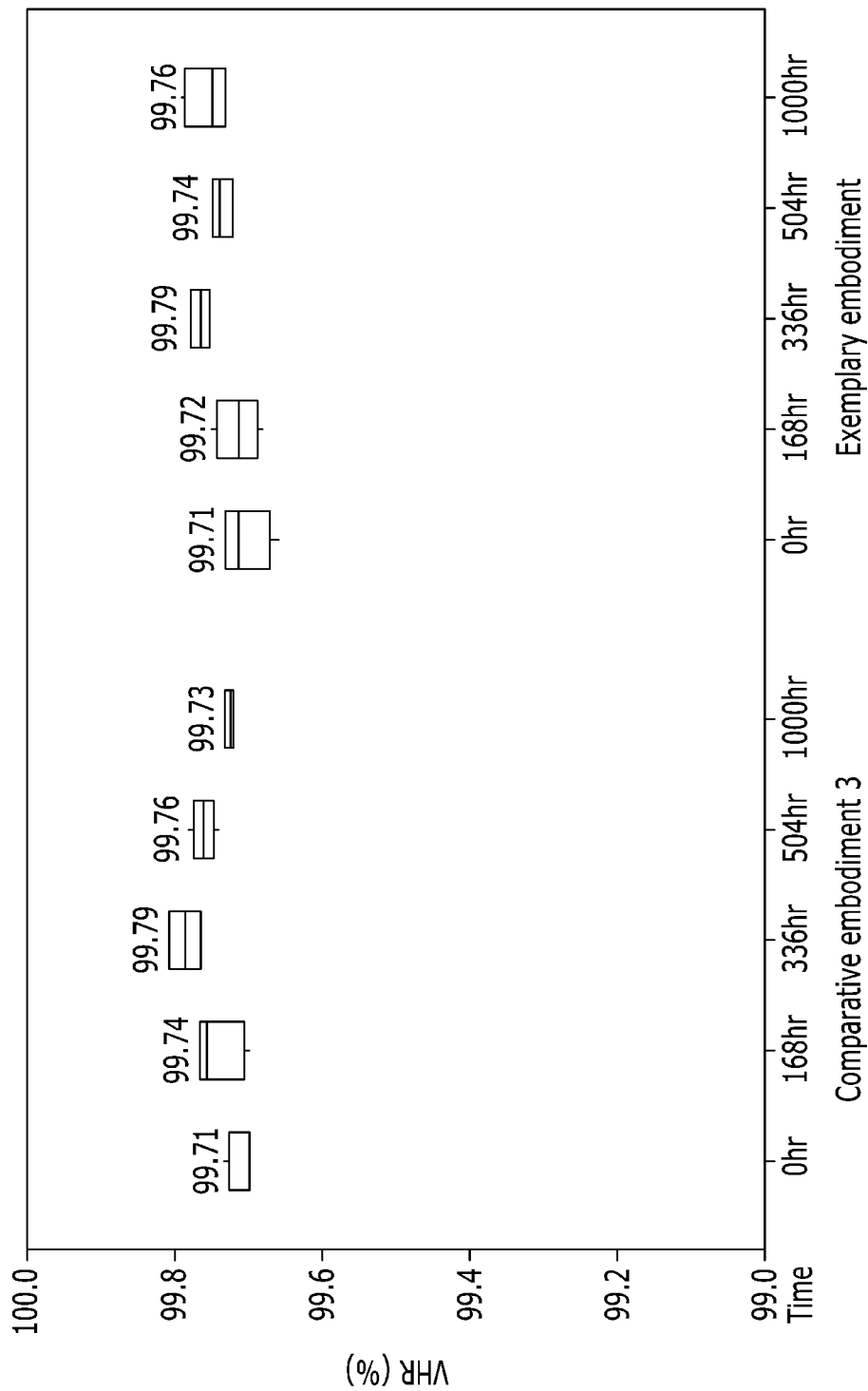
FIG. 10 and FIG. 11 show graphs of a voltage holding ratio (percent, %) versus time (hours, hr) of transmittance and exposure by light and heat.
Figure 11:
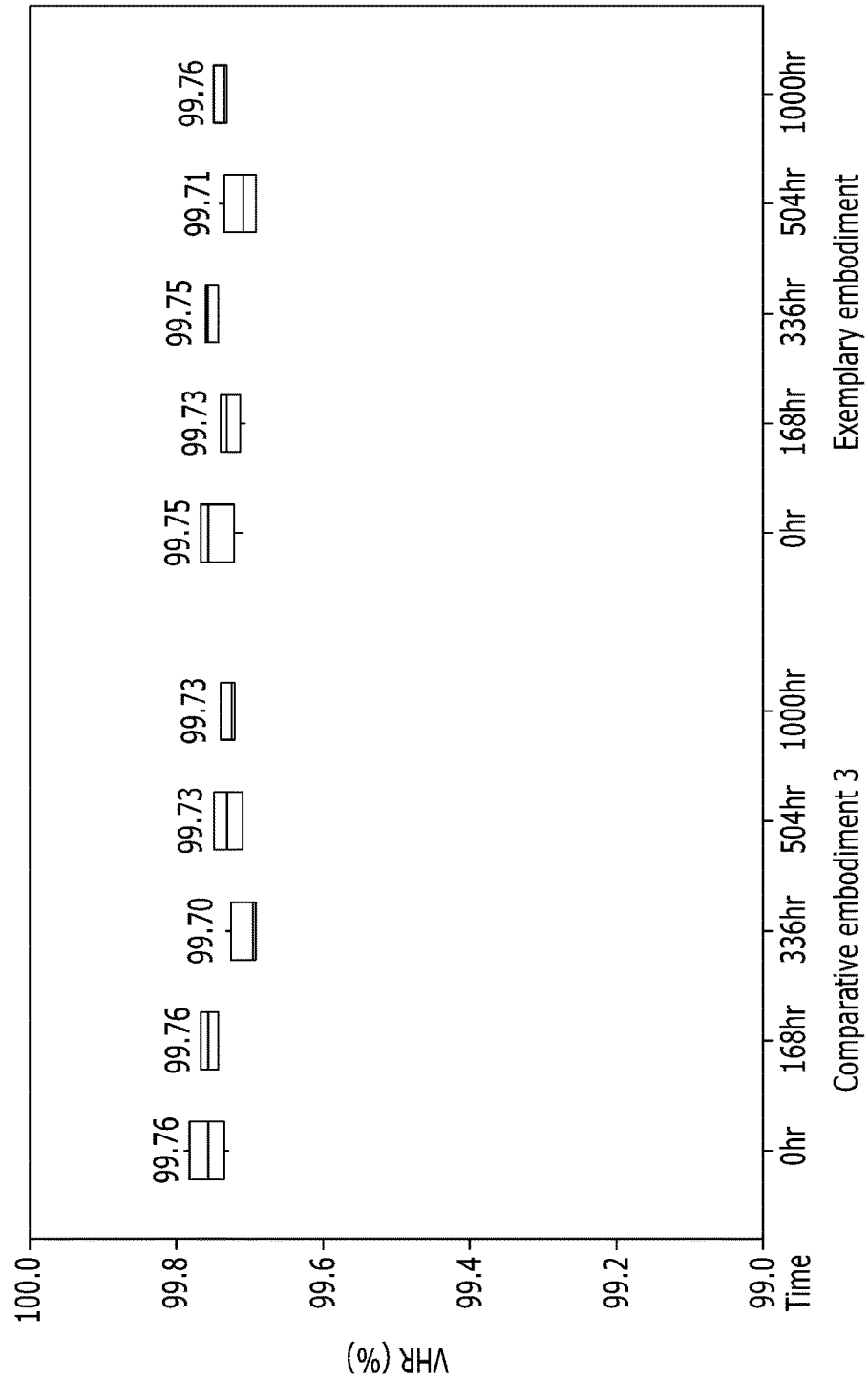

An effect of a liquid crystal composition according to an exemplary embodiment and Comparative Embodiments 1 to 3 will now be described with reference to FIG. 7 to FIG. 11. FIG. 7 shows a reliability graph of an exemplary embodiment and Comparative Embodiments 1 to 3. FIG. 8 shows a graph of an instant afterimage according to an exemplary embodiment and Comparative Embodiment 3. FIG. 9 shows a graph of a black afterimage level according to an exemplary embodiment and Comparative Embodiment 3. FIG. 10 and FIG. 11 show graphs of a voltage holding ratio on light and hear according to an exemplary embodiment and Comparative Embodiment 3.

Referring to FIG. 7 and Table 5, it is found that Comparative Embodiments 1 and 2 reduce a voltage holding ratio when energy applied under high-pressure mercury exposure conditions increases. However, in the liquid crystal composition according to an exemplary embodiment and Comparative Embodiment 3, the voltage holding ratio is maintained. The liquid crystal composition according to an exemplary embodiment compared to Comparative Embodiment 3 that is reliable and allows mass production also shows an equivalent level of the voltage holding ratio. This shows the identical aspect when a light unit (BLU) is exposed for sixty minutes.

TABLE 5

| | High-pressure mercury exposure | | | Light unit exposure |
|---|---|---|---|---|
| | 0 J | 6.5 J | 13 J | 60 minutes |
| Exemplary Embodiment | 98.72% | 98.54% | 98.23% | 99.22% |
| Comparative Embodiment 1 | 97.23% | 92.38% | 85.88% | 94.45% |

TABLE 5-continued

| | High-pressure mercury exposure | | | Light unit exposure |
|---|---|---|---|---|
| | 0 J | 6.5 J | 13 J | 60 minutes |
| Comparative Embodiment 2 | 96.54% | 91.42% | 86.23% | 93.12% |
| Comparative Embodiment 3 | 98.83% | 98.39% | 97.89% | 99.08% |

FIG. 8 shows a graph comparing an instant afterimage on liquid crystal compositions according to an exemplary embodiment and Comparative Embodiment 3 with a naked eye of a user. According to this graph, it is found that the instant afterimage is maintained for about 3.96 seconds in an exemplary embodiment, and the instant afterimage is maintained for about 4.26 seconds in Comparative Embodiment 3. That is, it is found that the instant afterimage is removed more quickly according to an exemplary embodiment.

As shown in FIG. 9, when a black afterimage level is examined, it is found that the liquid crystal compositions according to an exemplary embodiment and Comparative Embodiment 3 show an almost equivalent level of afterimage.

It is further found that an exemplary embodiment compared to Comparative Embodiment 3 that is reliable and allows mass production also shows an instant afterimage and a black afterimage in the level of mass production.

Referring to FIG. 10, it is found that an exemplary embodiment shows an almost equivalent level of the voltage holding ratio (99.71%) in the initial stage (0 hours, h) compared to Comparative Embodiment 3, and shows about 99.76% of the voltage holding ratio when 1,000 hours have passed. On the contrary, it is found that Comparative Embodiment 3 shows about 99.71% of the voltage holding ratio in the initial stage and it shows 99.73% of voltage holding ratio when 1,000 hours have passed. That is, it is found that an exemplary embodiment shows an almost equivalent level of the voltage holding ratio compared to Comparative Embodiment 3.

FIG. 11 shows a similar aspect. FIG. 11 shows a graph of a voltage holding ratio with respect to time when liquid crystal compositions according to an exemplary embodiment and Comparative Embodiment 3 are exposed to 70° C. heat and a 7 V electric field.

It is found that the initial voltage holding ratio is about 99.75% and the voltage holding ratio after 1,000 hours is about 99.76% according to an exemplary embodiment, and the voltage holding ratio is about 99.76% and the voltage holding ratio after 1,000 hours is 99.73% according to Comparative Embodiment 3.

TABLE 6

| | Exemplary Embodiment | Comparative embodiment |
|---|---|---|
| Transmittance | 21.2% | 21.4% |
| Reliability (1,000 hours of light exposure) | 99.8% | 99.7% |
| Reliability (1,000 hours of exposure of heat and electric field) | 99.7% | 99.7% |

As described with reference to Table 6, FIG. 10, and FIG. 11, an exemplary embodiment and Comparative Example 3 show substantially equivalent level of estimation degrees on the voltage holding ratios for transmittance and exposure by light or heat.

In summary, it is found that the liquid crystal composition according to an exemplary embodiment includes a compound and a liquid crystal stabilizing agent represented by Formula 1, through which the liquid crystal composition acquires the mass production level reliability and afterimage.

As described above, specific exemplary embodiments have been described and illustrated, but the present disclosure is not limited to the above-mentioned exemplary embodiments. Therefore, the present inventive concept can be variously changed and modified from the description by a person skilled in the art to which the subject matter of the present disclosure pertains without departing from the idea and scope of the present disclosure. Therefore, the modified examples or the changed examples are not to be individually construed from the technical spirit or aspect of the present disclosure, and therefore, the modified exemplary embodiments are to be construed to be included in the claims of the present disclosure.

What is claimed is:

1. A liquid crystal display comprising:
   a first substrate;
   a second substrate overlapping with the first substrate; and
   a liquid crystal layer provided between the first substrate and the second substrate,
   wherein the liquid crystal layer comprises:
   a liquid crystal compound represented by Formula 1, and
   a liquid crystal stabilizing agent:

Formula 1

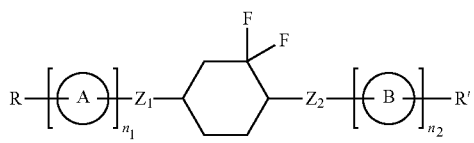

wherein A is each independently one of formulae

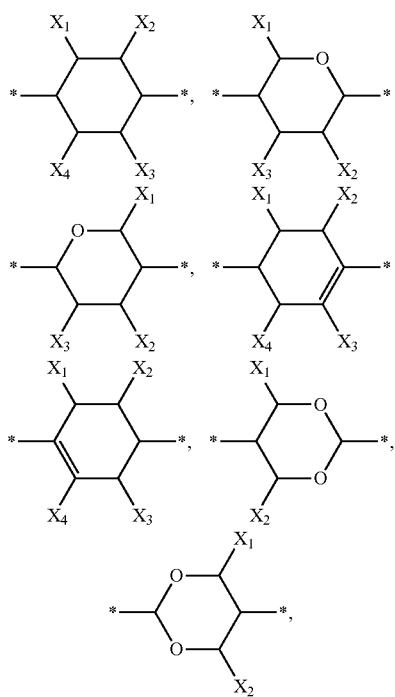

B is each independently one of formulae

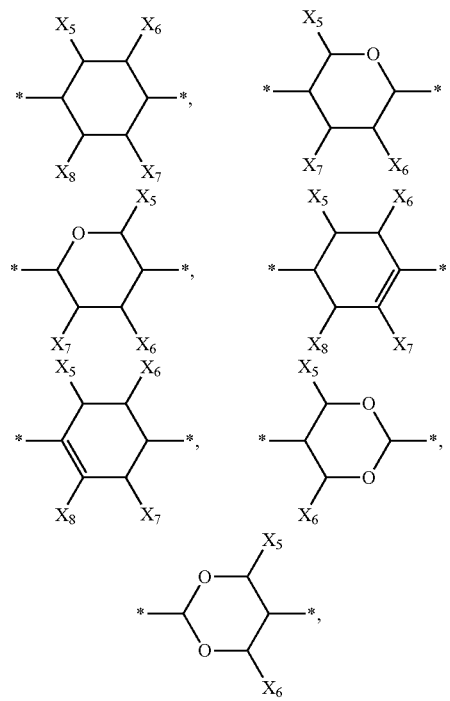

wherein

* indicates a binding site to an adjacent atom, $X_1$ to $X_8$ are each independently one of hydrogen (H), fluorine (F), chlorine (Cl), —$OCF_3$, —$CF_3$, —$CH_2F$, or —$CHF_2$, $Z_1$ and $Z_2$ are each independently one of —C(=O)O—, —OC(=O)—, —$CF_2O$—, —$OCF_2$—, —$CH_2O$—, —$OCH_2$—, —$SCH_2$—, —$CH_2S$—, —$C_2F_4$—, —$CH_2CF_2$—, —$CF_2CH_2$—, —$(CH_2)_z$— (wherein z is a natural number that is equal to or greater than 1 and equal to or less than 5), —CH=CH—, —CF=CF—, —CH=CF—, —CF=CH—, —CH=$CHCH_2$O—, or a single bond, R and R' are each independently one of a C1 to C12 alkyl group, a hydrogen, a halogen, or a cyano group, and $n_1$ and $n_2$ are each independently an integer between 0 and 5.

2. The liquid crystal display of claim 1, wherein
the compound represented by Formula 1 comprises a compound represented by Formula 1-1:

Formula 1-1

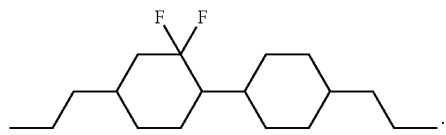

3. The liquid crystal display of claim 1, wherein
the liquid crystal stabilizing agent comprises at least one of a compound represented by Formulae A-1 to A-28:

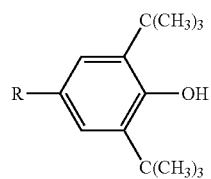
Formula A-1
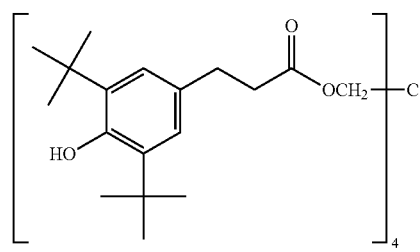
Formula A-2
Formula A-3
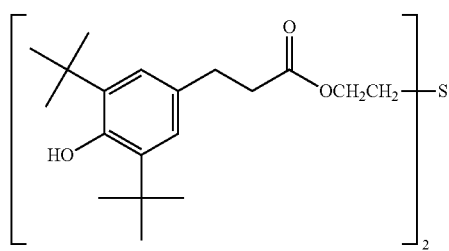
Formula A-4
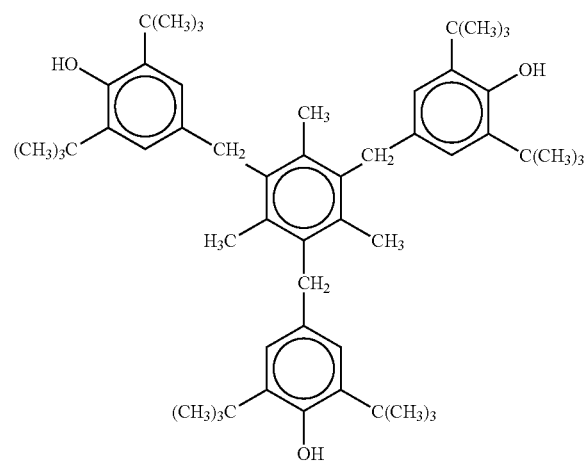
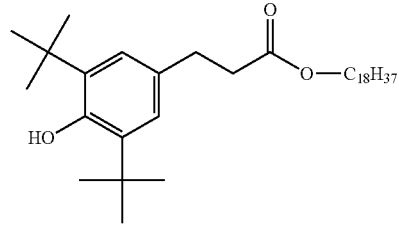
Formula A-5
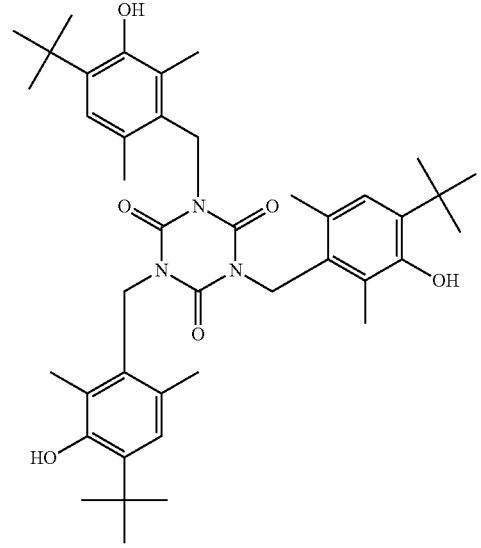
Formula A-6
Formula A-7
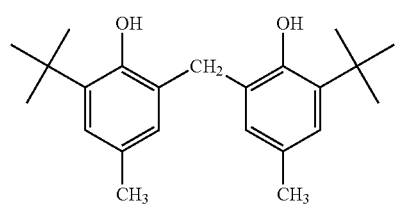
Formula A-8
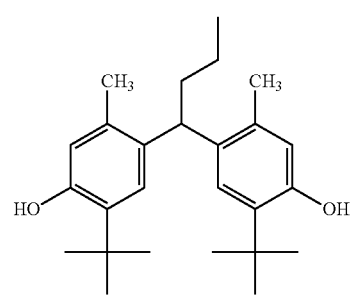

Formula A-9
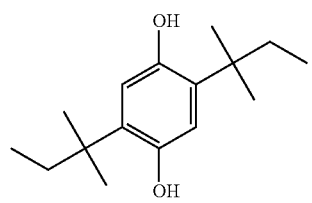
Formula A-10
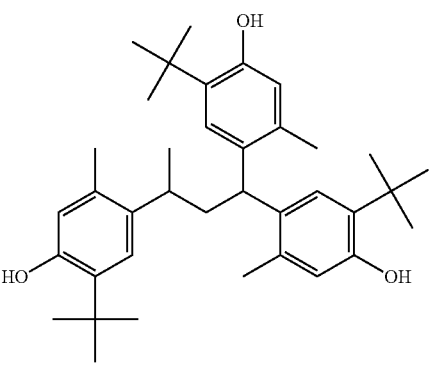
Formula A-11
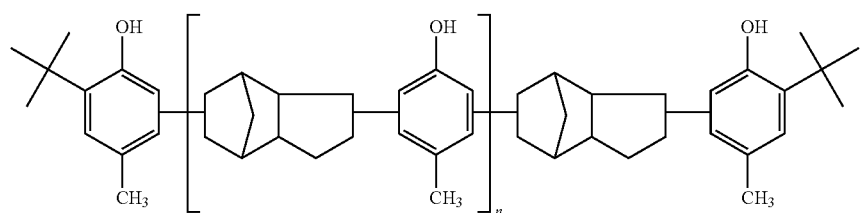
Formula A-12
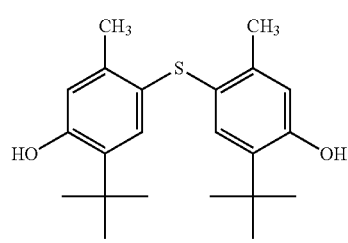
Formula A-13
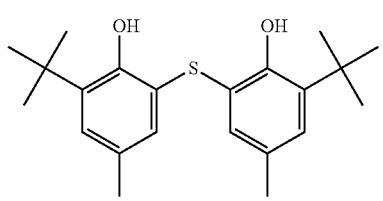
Formula A-14
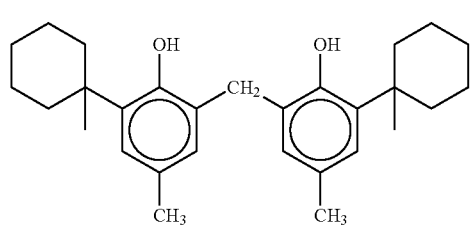
Formula A-15
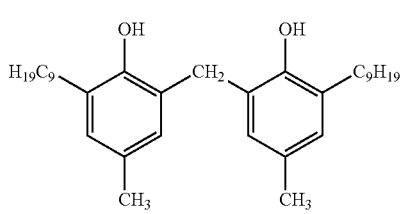
Formula A-16
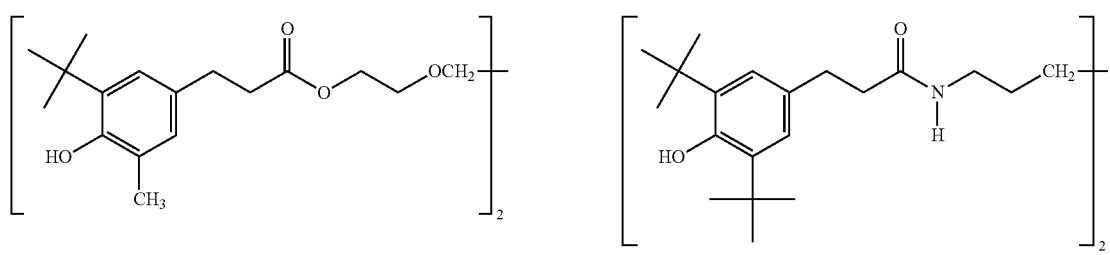
Formula A-17
Formula A-18
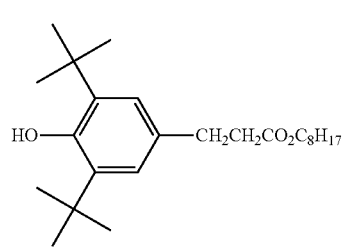
Formula A-19
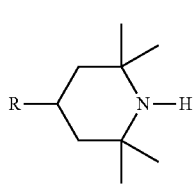

-continued

Formula A-20
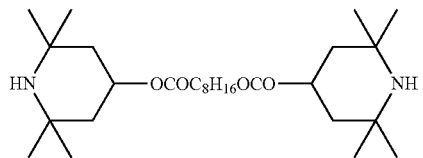

Formula A-21
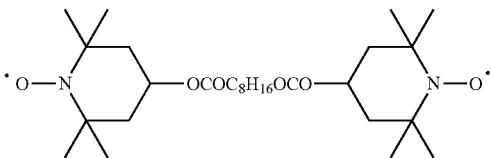

Formula A-22
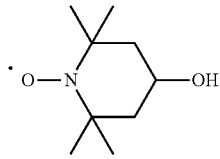

Formula A-23
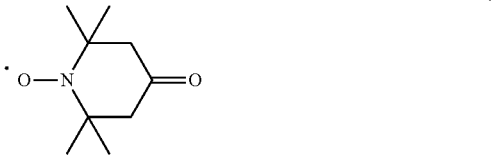

Formula A-24
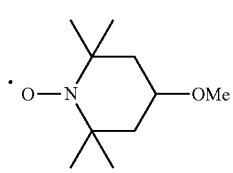

Formula A-25
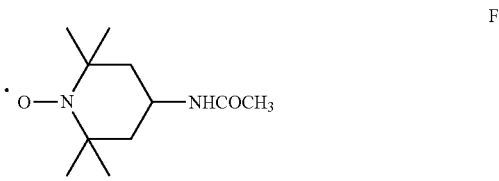

Formula A-26
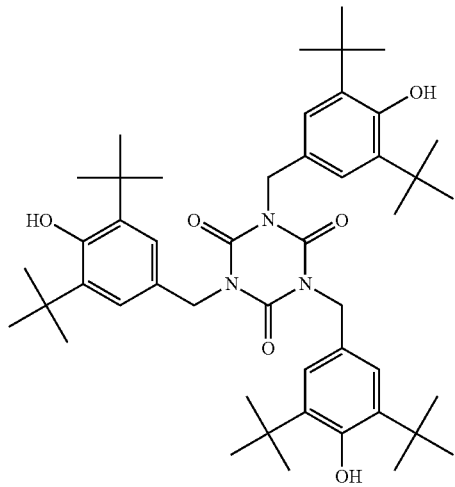

Formula A-27
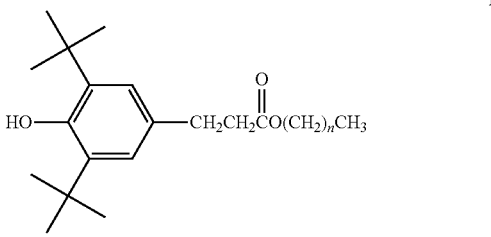

Formula A-28
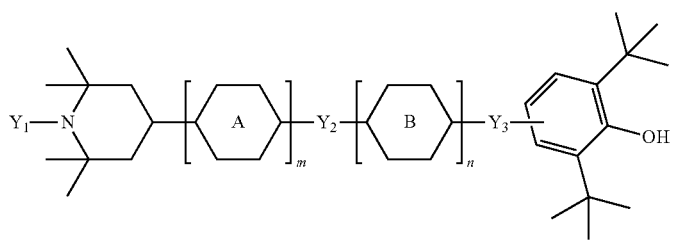

wherein,
in the Formula A-28,
$Y_1$ is one of —H, —OR, or —R,
$Y_2$ is one of —O—, —OC(=O)—, —OR'—, —R'O—, or —R'—,
$Y_3$ is one of —O—, —OC(=O)—, —OR'—, —R'O—, or —R'—,
A and B each independently comprise one of a cyclohexylene group, a C3 to C7 cyclic ether group, or a phenylene group,
R is a C1 to C5 alkyl group,
R' is a C1 to C5 alkylene group, and
m and n are independently an integer of 0 to 5, in the Formula A-1,
R is a C1 to C10 alkyl group or a C2 to C10 alkenyl group,
in the Formula A-11,
n is an integer that is equal to or greater than 0 and is equal to or less than 5,
in the Formula A-19,
R is a C1 to C10 alkyl group or a C2 to C10 alkenyl group, and
in the Formula A-27,
n is a natural number of 1 to 15.

4. The liquid crystal display of claim 3, wherein the compound represented by Formula A-28 comprises at least one of a compound represented by Formula A-28' or a compound represented by Formula A-28":

Formula A-28'

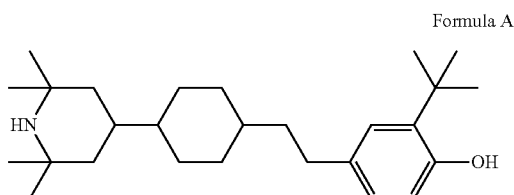

Formula A-28''

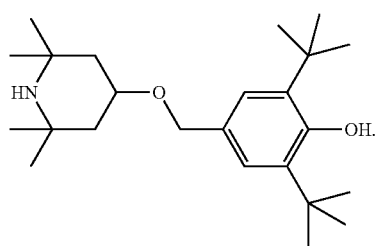

5. The liquid crystal display of claim 1, wherein
an amount of the compound represented by Formula 1 is about 3 percent by weight to about 20 percent by weight based on the entire amount of a liquid crystal composition constituting the liquid crystal layer.

6. The liquid crystal display of claim 5, wherein
the liquid crystal composition comprises about 100 parts per million to about 500 parts per million of the liquid crystal stabilizing agent.

7. The liquid crystal display of claim 1, wherein
the liquid crystal layer further comprises at least one of compounds represented by Formula 2 to Formula 21:

Formula 2

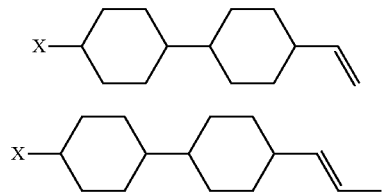

Formula 3

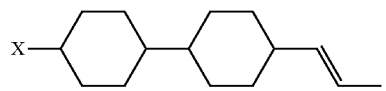

Formula 4

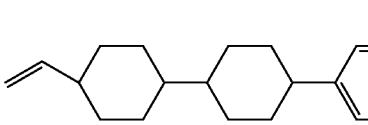

Formula 5

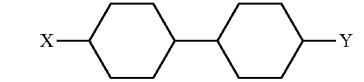

Formula 6

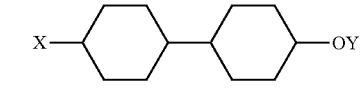

Formula 7

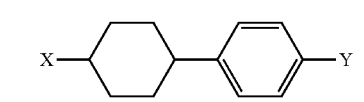

Formula 8

Formula 9

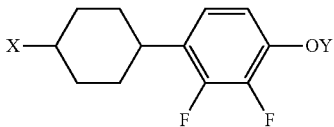

Formula 10

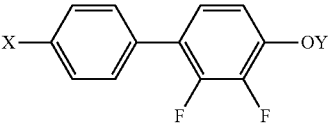

Formula 11

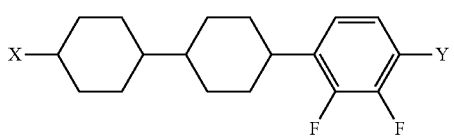

Formula 12

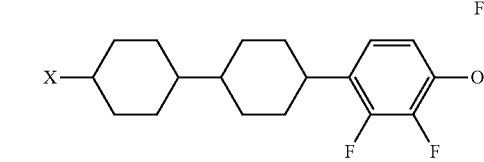

Formula 13

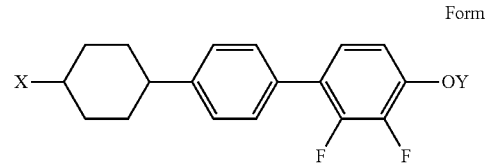

Formula 14

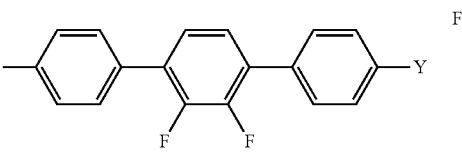

Formula 15

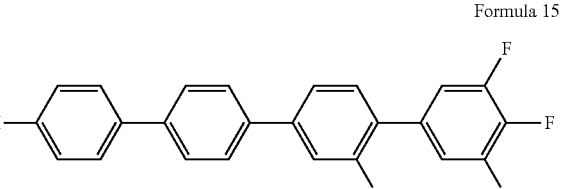

Formula 16

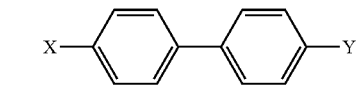

Formula 17

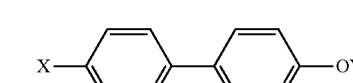

Formula 18

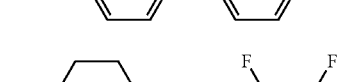

Formula 19

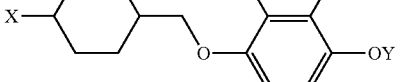

-continued

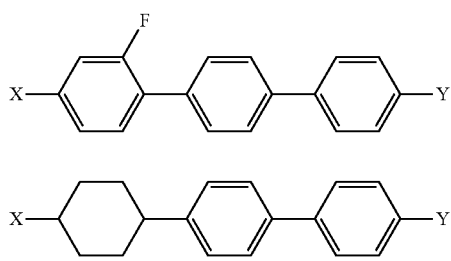

Formula 20

Formula 21 wherein X and Y are each independently $C_nH_{2n+1}$, wherein n is independently a natural number of 1 to 5.

8. The liquid crystal display of claim 1, further comprising:
a thin film transistor provided on the first substrate;
a pixel electrode connected to the thin film transistor; and
a common electrode provided between the second substrate and the liquid crystal layer.

9. The liquid crystal display of claim 8, further comprising:
a light blocking member provided between the pixel electrode and the liquid crystal layer,
wherein the light blocking member comprises:
a light blocker,
a first spacer, and
a second spacer,
wherein the first spacer and the second spacer are connected to the light blocker and protruded toward the second substrate.

10. The liquid crystal display of claim 8, wherein
at least one of the pixel electrode or the common electrode comprises a cutout.

11. The liquid crystal display of claim 1, wherein
the liquid crystal display is curved.

12. The liquid crystal display of claim 11, wherein
liquid crystal molecules that are adjacent to the first substrate have a pretilt, and
liquid crystal molecules that are adjacent to the second substrate are perpendicular to the second substrate.

* * * * *